US008861888B2

(12) United States Patent
Oyama

(10) Patent No.: US 8,861,888 B2
(45) Date of Patent: Oct. 14, 2014

(54) IMAGE PROCESSING DEVICE, IMAGING DEVICE, AND IMAGE PROCESSING METHOD

(75) Inventor: Ichiro Oyama, Osaka (JP)

(73) Assignee: Panasonic Corporation, Osaka (JP)

(*) Notice: Subject to any disclaimer, the term of this patent is extended or adjusted under 35 U.S.C. 154(b) by 218 days.

(21) Appl. No.: 13/519,162

(22) PCT Filed: Dec. 21, 2011

(86) PCT No.: PCT/JP2011/007184
§ 371 (c)(1),
(2), (4) Date: Jun. 26, 2012

(87) PCT Pub. No.: WO2012/127552
PCT Pub. Date: Sep. 27, 2012

(65) Prior Publication Data
US 2013/0120614 A1 May 16, 2013

(30) Foreign Application Priority Data
Mar. 23, 2011 (JP) .................................. 2011-065039

(51) Int. Cl.
G06K 9/40 (2006.01)
G06T 15/50 (2011.01)
G03F 3/08 (2006.01)
G06T 5/10 (2006.01)
G06T 5/00 (2006.01)
H04N 5/235 (2006.01)
H04N 5/357 (2011.01)

(52) U.S. Cl.
CPC ............... H04N 5/2351 (2013.01); G06T 5/10 (2013.01); H04N 5/3572 (2013.01); G06T 5/003 (2013.01); G06T 2207/20224 (2013.01); G06T 2207/20056 (2013.01)
USPC ............................. 382/274; 345/426; 358/520

(58) Field of Classification Search
CPC . H04N 5/3572; H04N 5/2351; H04N 1/6058; H04N 1/60; H04N 1/6027; G06T 5/003; G06T 5/10; G06T 15/503; G06T 15/506; G06T 15/50; G06T 15/80; G06T 2200/12; G06T 2207/20056; G06T 2207/20224
USPC ........... 382/167, 274, 275; 358/520; 345/426, 345/611; 348/234
See application file for complete search history.

(56) References Cited

U.S. PATENT DOCUMENTS 6,088,059 A 7/2000 Mihara et al.
6,480,300 B1 * 11/2002 Aoyama ....................... 358/1.9
(Continued)

FOREIGN PATENT DOCUMENTS

JP 9-238357 9/1997
JP 11-355636 12/1999
(Continued)

OTHER PUBLICATIONS

International Search Report issued Jan. 31, 2012 in International (PCT) Application No. PCT/JP2011/007184.

*Primary Examiner* — Kanjibhai Patel
(74) *Attorney, Agent, or Firm* — Wenderoth, Lind & Ponack, L.L.P.

(57) ABSTRACT

An image processing device includes: a luminance saturation position detection unit which detects a luminance saturation position to produce a light source image; a flare model production unit which produces a flare model image based on the light source image and optical characteristics data of the optical system; a flare position setting unit which sets, as a flare position, a predetermined image position in the captured image and located near the luminance saturation position and on a side of an optical axis relative to the luminance saturation position; a flare model luminance adjustment unit which produces the estimated flare image by adjusting luminance gain of the flare model image, based on a relationship between a luminance value of the captured image at the flare position and a luminance value of the flare model image at the flare position; and an unnecessary light subtraction unit which subtracts the estimated flare image from the captured image.

13 Claims, 18 Drawing Sheets

(56) References Cited

U.S. PATENT DOCUMENTS

| | | | |
|---|---|---|---|
| 6,809,838 B1 * | 10/2004 | Gilman et al. | 358/1.9 |
| 6,912,321 B2 * | 6/2005 | Gindele | 382/274 |
| 7,362,895 B2 * | 4/2008 | Masumura et al. | 382/167 |
| 7,489,345 B2 | 2/2009 | Fukumoto | |
| 7,764,319 B2 | 7/2010 | Fukumoto | |
| 7,773,805 B2 * | 8/2010 | Ovsiannikov | 382/168 |
| 7,864,427 B2 | 1/2011 | Korenaga et al. | |
| 7,978,201 B2 * | 7/2011 | Cho et al. | 345/581 |
| 8,169,672 B2 * | 5/2012 | Yamauchi et al. | 358/475 |
| 8,208,043 B2 * | 6/2012 | Deng et al. | 348/241 |
| 2005/0093992 A1 | 5/2005 | Fukumoto | |
| 2009/0027521 A1 | 1/2009 | Fukumoto | |
| 2009/0147116 A1 | 6/2009 | Koyama et al. | |
| 2010/0134888 A1 | 6/2010 | Korenaga et al. | |

FOREIGN PATENT DOCUMENTS

| | | |
|---|---|---|
| JP | 2005-167485 | 6/2005 |
| JP | 4077508 | 4/2008 |
| JP | 2009-141813 | 6/2009 |
| JP | 2009-152921 | 7/2009 |

\* cited by examiner

PSF

Captured image

Captured image

Luminance transition of captured image

Light source image Is

Amplitude spectrum of light source frequency data

Amplitude spectrum of OTF

Amplitude spectrum of flare model frequency data

Flare model image Ifm'

Flare model image Ifm

PSF

First object

Second object

Captured image of first object

Captured image of second object

Luminance transition of captured image of first object

Luminance transition of captured image of second object

Output image of first object

Output image of second object

Luminance transition of output image of first object

Luminance transition of output image of second object

Luminance transition of estimated flare image of first object

Luminance transition of estimated flare image of second object

Captured image of first object

Captured image of second object

Luminance transition of captured image of first object

Output image of second object

Luminance transition of
output image of first object

Luminance transition of
output image of second object

Luminance transition of estimated flare image of first object

Luminance transition of estimated flare image of second object

Shrunk light source image

Output image of first object

Luminance transition of output image of first object

IMAGE PROCESSING DEVICE, IMAGING DEVICE, AND IMAGE PROCESSING METHOD

TECHNICAL FIELD

The present invention relates to techniques for reducing an unnecessary light component in an image captured through an optical system including a diffractive optical element by performing image processing.

BACKGROUND ART

When an image of a bright object is captured by an imaging device that captures an object, unnecessary light around the object can be bright enough and visible, adversely affecting the captured image. Especially when a diffractive lens having a diffraction grating is used, unnecessary light due to unnecessary order diffracted light other than the design order of a diffractive lens is generated, and thus the unnecessary light can be larger compared to the optical system including only an aspheric lens.

There is a conventional technique which reduces the unnecessary light by performing image processing. For example, according to PTL 1, unnecessary light is estimated based on a convolution integral of a point spread function (PSF) of an unnecessary order diffracted light (zeroth order light and second order light) of a diffractive lens and a captured image, and the unnecessary light is reduced by subtracting the estimated unnecessary light from the original image.

Furthermore, according to PTL 2, a plurality of images is captured with different exposure times, unnecessary light is estimated based on an image captured with a short exposure time, and the unnecessary light is reduced by subtracting the estimated unnecessary light from the image captured with a long exposure time.

CITATION LIST

Patent Literature

[PTL 1]
Japanese Unexamined Patent Application Publication No. 9-238357
[PTL 2]
Japanese Unexamined Patent Application Publication No. 11-355636

SUMMARY OF INVENTION

Technical Problem

The inventor of the present invention have found that large unnecessary light of arc-shaped flare light that is different from unnecessary light caused by the above-described unnecessary order diffracted light is generated in the captured image at the image position away from an optical axis position when a very bright object is captured using a diffractive lens. Furthermore, it was found that the unnecessary light of arc-shaped flare light can significantly degrade the quality of the captured image.

The unnecessary light of arc-shaped flare light is different from the unnecessary light caused by the unnecessary order diffracted light. Thus, the method described in PTL 1 in which the unnecessary light is reduced by using a PSF of the unnecessary order diffracted light cannot be used to reduce the unnecessary light of arc-shaped flare light. Furthermore, when the unnecessary light is estimated based on a convolution integral of a PSF and a captured image according to PTL 1 and the luminance of the captured image is saturated due to a bright object, the unnecessary light is estimated based on incorrect brightness (luminance) of the object at the luminance saturation portion. This makes it difficult to appropriately estimate the unnecessary light. The brighter the subject is, exceeding a saturation level of the captured image, the smaller the estimated unnecessary light component becomes than the actual unnecessary light component. In other words, when the object is bright and luminance of the captured image is saturated, the unnecessary light cannot be appropriately reduced.

Furthermore, according to PTL 2, a plurality of images needs to be captured with different exposure times and calculation needs to be performed, leading to an increase in calculation cost. Moreover, there is a case where the unnecessary light cannot be estimated appropriately, when moving images are captured.

The present invention has been conceived in order to solve the aforementioned problems, and has as an object to provide an image processing device, an imaging device, and an image processing method which make it possible to appropriately reduce by image processing the unnecessary light component included in the captured image, even when the luminance is saturated in the image captured through the optical system including a diffractive optical element.

Solution to Problem

In order to achieve the aforementioned object, an image processing device according to an aspect of the present invention is an image processing device which reduces an unnecessary light component in an image captured through an optical system including a diffractive optical element, the image processing device includes: a flare image estimation unit configured to produce an estimated flare image that appears around a bright object in the captured image; and an unnecessary light subtraction unit configured to subtract the estimated flare image from the captured image, wherein the flare image estimation unit includes: a luminance saturation position detection unit configured to detect a luminance saturation position to produce a light source image, the luminance saturation position being an image position in the captured image at which a luminance value is greater than a predetermined value; a flare model production unit configured to produce a flare model image based on the light source image and optical characteristics data of the optical system; a flare position setting unit configured to set, as a flare position, a predetermined image position, which is an image position in the captured image and located near the luminance saturation position and on a side of an optical axis relative to the luminance saturation position; and a flare model luminance adjustment unit configured to produce the estimated flare image by adjusting a gain of a luminance of the flare model image, based on a relationship between a luminance value of the captured image at the flare position and a luminance value of the flare model image at the flare position.

According to this structure, at the image position having a large unnecessary light that is characteristic of diffraction grating, the luminance value of the captured image and the luminance value of the flare model image are compared with each other. This makes it possible to appropriately adjust the gain of the luminance of the flare model image, and thus the estimated flare image can be produced with high accuracy. The thus produced estimated flare image is subtracted from the captured image. With this, the unnecessary light can be appropriately reduced from the captured image obtained by one shooting, even when the luminance of the captured image is saturated.

The present invention can be implemented, not only as an image processing device that includes such characteristic processing units as those described above, but also as the image processing method having, as steps, the characteristic processing units included in the image processing device.

Advantageous Effects of Invention

According to the present invention, an unnecessary light component included in a captured image can be appropriately reduced by image processing, even when luminance is saturated in the image captured through an optical system including a diffractive optical element.

DESCRIPTION OF EMBODIMENTS

First, the following describes a phenomenon in which the unnecessary light of arc-shaped flare light appears in a level bright enough to be visible in a surrounding area of the object image having saturated luminance, when an image of a bright object is captured using an imaging device having an optical system including a diffractive optical element. Then, the details of embodiments according to the present invention shall be described.

Figure 1:
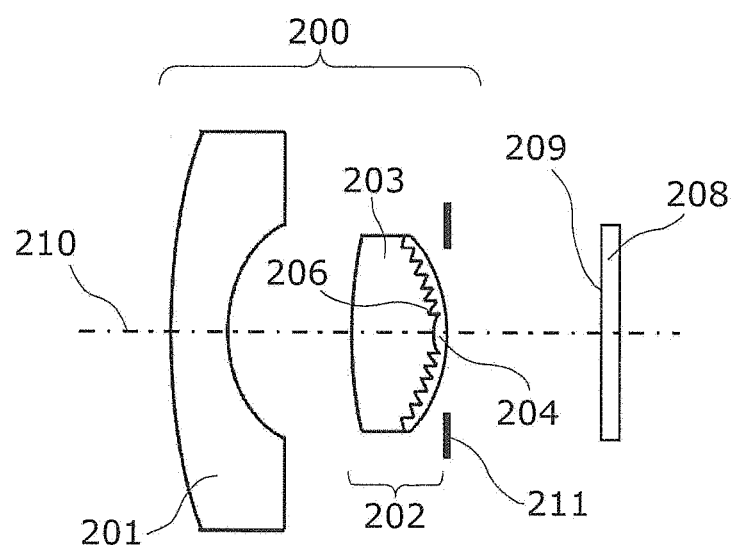
FIG. 1 schematically shows a structural example of an optical system according to embodiments of the present invention.

FIG. 1 schematically shows a structural example of an optical system according to embodiments of the present invention. As shown in FIG. 1, an optical system 200 includes: a lens 201 having a negative power; and a diffractive lens 202 having a positive power.

The diffractive lens 202 corresponds to a diffractive optical element, and is made of a first component 203 and a second component 204 that are made of mutually different materials. One side of the first component 203 is formed in an aspheric shape. Furthermore, a diffraction grating 206 that has rings about the optical axis 210 is formed on the other side of the surface of the first component 203. The surface of the diffraction grating 206 is covered by the second component 204 so as to have a non-aspheric shape.

The image of the object is formed on the imaging surface 209 of the imaging element 208 through the optical system 200. The image of the object formed on the imaging surface is captured by the imaging element 208 as a captured image. The imaging element 208 includes Charge Coupled Device (CCD), Complementary Metal Oxide Semiconductor (CMOS), or the like. The diaphragm 211 is disposed on the side of an imaging surface of the diffractive lens 202 and adjusts a ray which enters the imaging surface 209 of the imaging device 208.

A grating thickness "d" of the diffraction grating 206 can be obtained by using Equation 1.

[Math 1]

$$d = \frac{m\lambda}{n2 - n1} \qquad \text{(Equation 1)}$$

Here, n1 represents a refractive index of the first component 203, and n2 represents a refractive index of the second component 204. Represents by "λ" is a wavelength. Here, the optical system 200 is an optical system that is used to capture an image. Thus, "λ" is a value in a wavelength range in a visible range of approximately from 400 nm to 700 nm.

Represented by "m" is a diffraction order. Here, it is m=1. In other words, the grating thickness "d" of the diffraction grating 206 is designed such that a diffraction efficiency of the first order diffracted light is high. It is known that the diffractive lens 202 can achieve high first order diffraction efficiency in the entire wavelength range in the visible range, by combining the first component 203 and the second component 204 having refractive indexes (n1 and n2, respectively) that allow "d" to be a substantially constant value in the wavelength range in the visible range (for example, see Japanese Patent No. 4077508). The embodiment of the present invention employs the first component 203 and the second component 204 so that n1 and n2 allow "d" to be a substantially constant value.

Figure 2A:
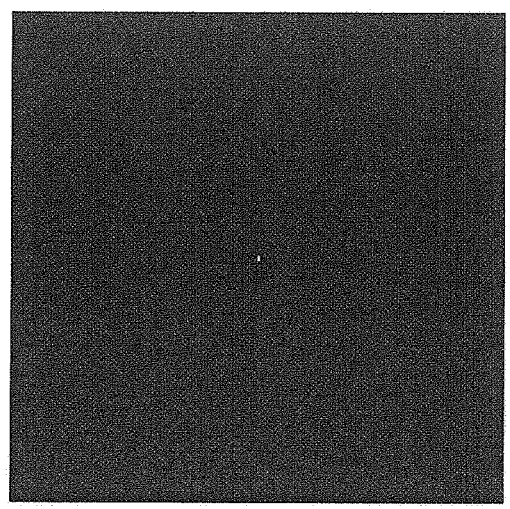
FIG. 2A is a diagram showing a PSF of the optical system according to the embodiments of the present invention.
Figure 2B:
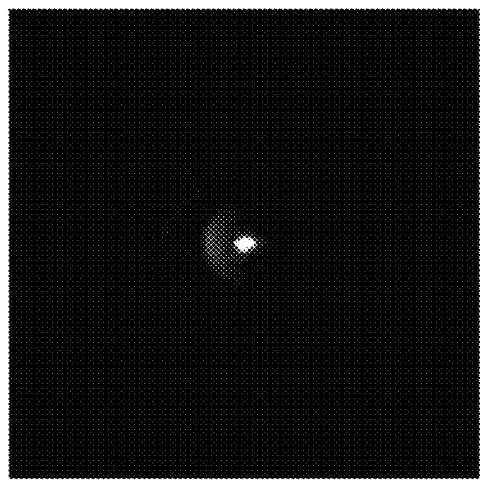
FIG. 2B is a diagram showing a PSF of the optical system according to the embodiments of the present invention.

FIG. 2A shows a PSF image of the optical system 200 in FIG. 1 at an angle of view approximately 45 degrees. FIG. 2B shows a PSF image obtained by adjusting the brightness of the PSF shown in FIG. 2A so that the distribution of the unnecessary light component of the PSF can be easily observed. In each of FIG. 2A and FIG. 2B, a side of the optical axis is on the left relative to the center of the image. In other words, an image position, which corresponds to the position at which the optical axis and the imaging surface intersects, exists on the left in the image. Note that the PSF is a function that expresses response of the optical system to a point light source, and can be expressed as an image.

Figure 3A:
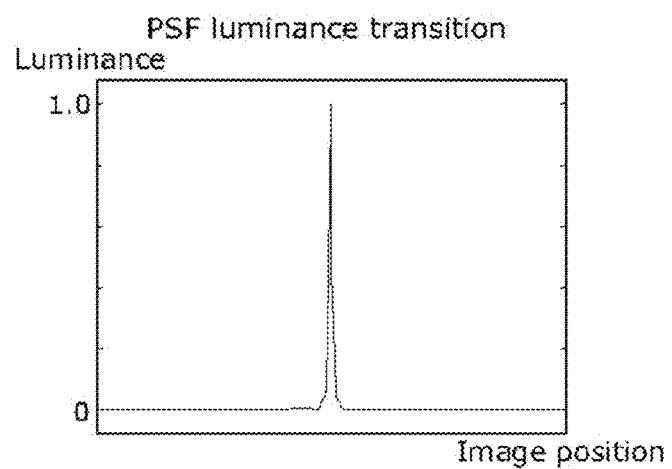
FIG. 3A is a diagram showing a luminance transition of the PSF of the optical system according to the embodiments of the present invention.
Figure 3B:
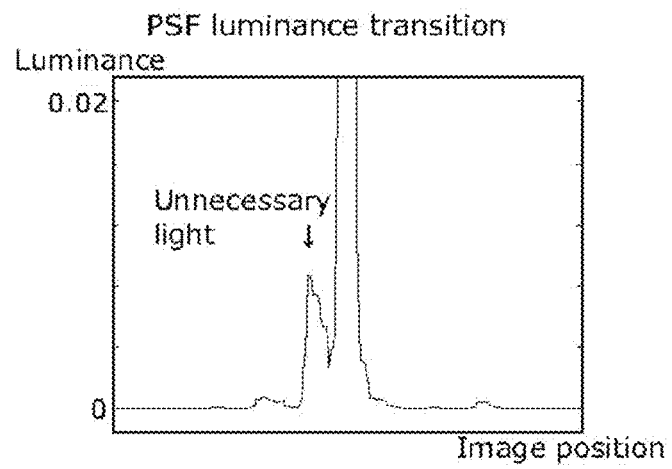
FIG. 3B is a diagram showing a luminance transition of the PSF of the optical system according to the embodiments of the present invention.

FIG. 3A shows a luminance transition in the horizontal direction of the image in the surrounding area of a highest luminance position of the PSF in FIG. 2A. In FIG. 3A, the vertical axis represents a luminance, and the horizontal axis represents the image position. FIG. 3B shows the luminance transition where the scale of the vertical axis of FIG. 3A is enlarged.

As shown in FIG. 2A to FIG. 3B, arc-shaped unnecessary light having high luminance appears in the image captured using the optical system including the diffractive grating. Note that unnecessary light is unnecessary light that appears in an image. In other words, unnecessary light is, in essence, unwanted light in the image. The unnecessary light deteriorates the image quality.

The inventor of the present invention have found that such unnecessary light has larger luminance compared to the unnecessary order diffracted light other than the design order light, such as zeroth order and second order diffracted light, and is generated due to the pitches of diffraction rings. Specifically, as shown in FIG. 2A to FIG. 3B, especially at an image position which is other than the optical axis and is at a finite angle of view, an experiment also shows that large arc-shaped unnecessary light appears on the side of the optical axis relative to the bright object. In particular, as shown in FIG. 3B, large unnecessary light appears on the side of the optical axis relative to the highest luminance position of the PSF when the grating thickness "d" of the diffraction grating is great.

The large unnecessary light appears at the position on the side of the optical axis relative to the position of the object image, when the luminance of the position at which an image of the object is captured in the image obtained by capturing a bright object. The thus appeared unnecessary light adversely affects the captured image.

Figure 4:
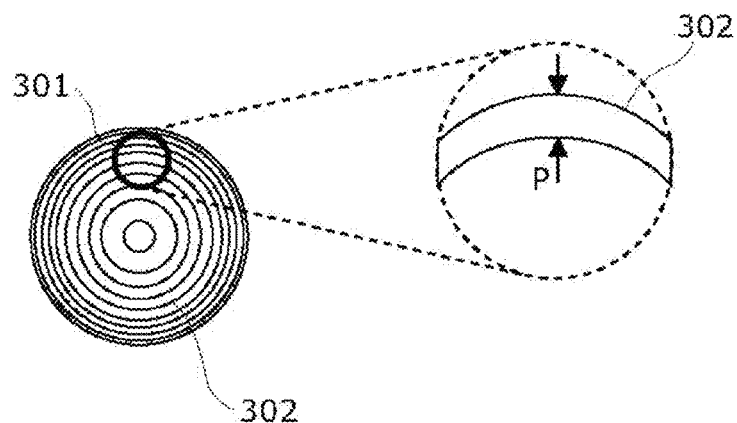
FIG. 4 is a diagram showing a diffractive lens according to the embodiments of the present invention.

The following describes the principle of generation of the large arc-shaped unnecessary light due to pitches of diffraction rings. FIG. 4 is a schematic diagram showing, from the side of an object, the diffraction rings formed on the diffractive lens 202. As shown in FIG. 4, in the diffractive lens on which diffraction grating 301 is formed, each of diffraction rings 302 is disposed between the step surfaces that are arranged concentrically.

Thus, the light which passes each of the adjacent two diffraction rings 302 can be regarded as light that transmit a slit of a width of the diffraction ring 302 (diffraction ring pitch P). Generally, the diffractive lens can correct aberration well by decreasing the diffraction ring pitch P. However, when the width of the diffraction ring 302 is small, the light that transmits the diffractive lens can be considered as the light that passes through a slit of very small width arranged concentrically. In this case, a diffraction phenomenon of a wavefront of light is observed in the vicinity of the step surfaces.

Figure 5:
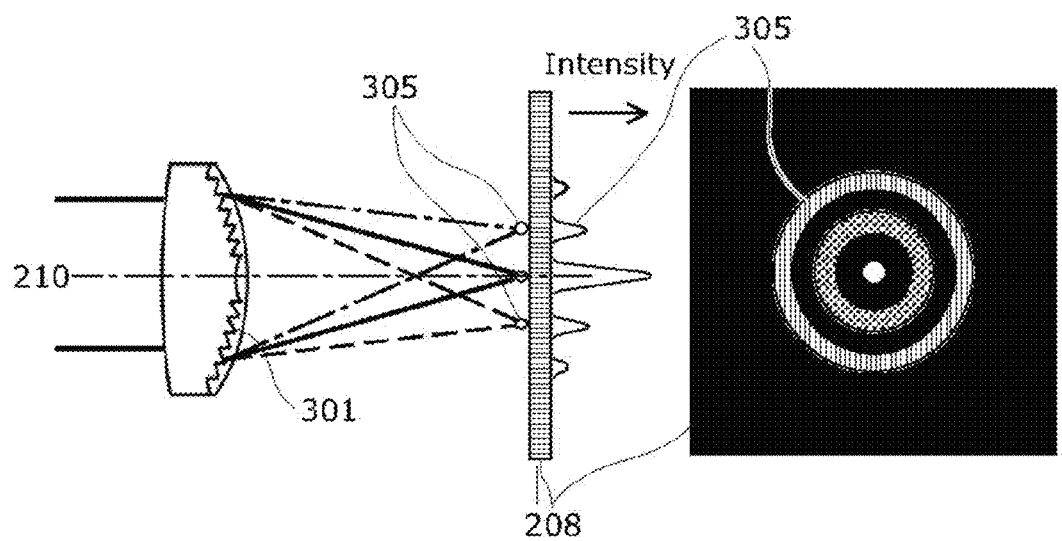
FIG. 5 is a diagram which describes a principle of generation of flare light according to the embodiments of the present invention.

FIG. 5 schematically shows light that is diffracted by a diffraction grating 301. Generally, the light that is transmitted through the slit of very small width P forms diffraction fringe at the observation point at an infinite distance. This is called Fraunhofer diffraction. This diffraction phenomenon also occurs at a finite distance (e.g., a focus plane) when a lens system having a positive focal length is included.

The inventor of the present invention conducted an image evaluation by using an actual lens and confirmed that banded flare light 305 such as the one shown in FIG. 5 that spreads concentrically appears because light that is transmitted through the diffraction rings interferes with each other when the width of the diffraction ring 302 is small. Furthermore, it is confirmed by the image evaluation using the actual lens that arc-shaped flare light such as the one shown in FIG. 2A or FIG. 2B can appear due to light which enters obliquely relative to the optical axis and passes through only a portion of the diffraction ring. Furthermore, detailed examination revealed that the unnecessary order diffracted light does not appear on a particular wavelength but the arc-shaped flare light appears in the entire range of wavelength in use including the design wavelength.

Figure 6:
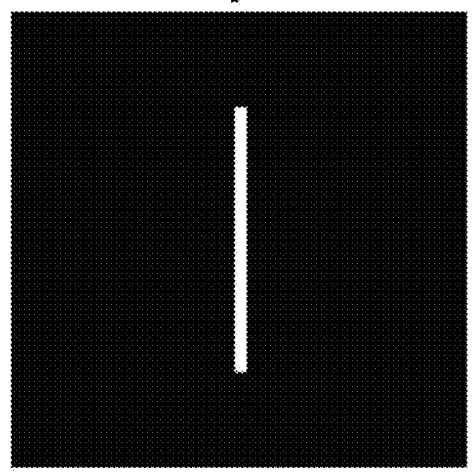
FIG. 6 is a diagram showing an object according to the embodiments of the present invention.
Figure 7A:
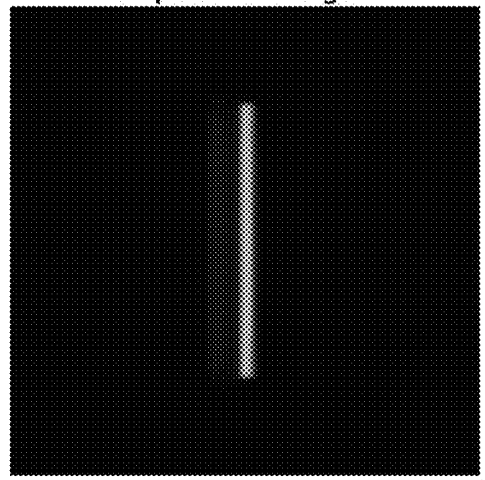
FIG. 7A is a diagram showing a captured image of the object according to the embodiments of the present invention.
Figure 7B:
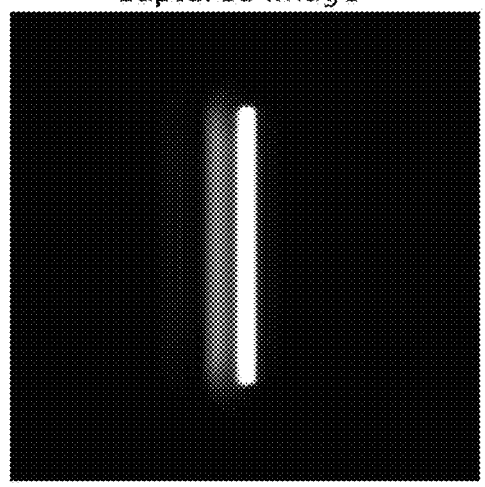
FIG. 7B is a diagram showing the captured image of the object according to the embodiments of the present invention.

FIG. 6 shows a light source which is produced by a simulation assuming a fluorescent lamp. Each of FIG. 7A and FIG. 7B shows an example of an image in which a light source is captured through the optical system which includes a diffractive optical element. The captured images shown in FIG. 7A and FIG. 7B are images that are obtained by capturing, by using the optical system shown in FIG. 1, the rectangular-shaped light source having uniform luminance shown in FIG. 6. Furthermore, each of the captured images shown in FIG. 7A and FIG. 7B shows an image of a fluorescent lamp captured at an angle of view approximately 45 degrees. Note that each of FIG. 7A and FIG. 7B are an image that is produced simulating the actually captured image, by performing a convolution integral on the PSF shown in FIG. 2A and the object image shown in FIG. 6.

FIG. 7A is a diagram showing a captured image that is produced such that the highest luminance of the light source image is 0.7 when it is assumed that the luminance saturation level of the captured image is 1.0. Furthermore, FIG. 7B is a diagram showing a captured image that is produced such that the highest luminance of the light source image is 3.0 when it is assumed that the luminance saturation level of the captured image is 1.0.

Figure 8A:
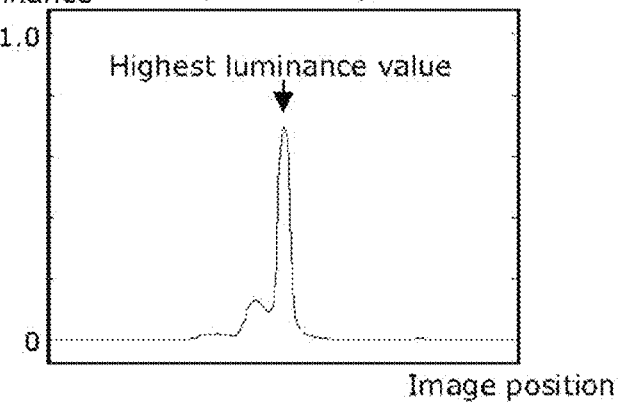
FIG. 8A is a diagram showing a luminance transition of the captured image of the object according to the embodiments of the present invention.
Figure 8B:
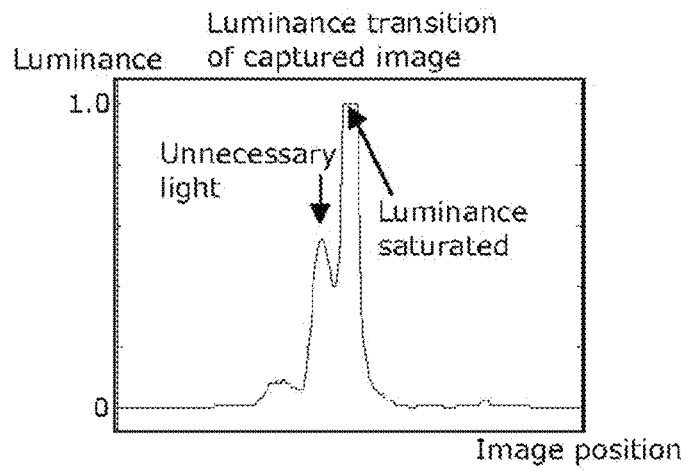
FIG. 8B is a diagram showing a luminance transition of the captured image of the object according to the embodiments of the present invention.

In FIG. 7B, luminance of the captured image is saturated at the image position having a luminance greater than 1.0 on the imaging surface 209. FIG. 8A and FIG. 8B show luminance transition in the horizontal direction of the images near the center of the captured image shown in FIG. 7A and FIG. 7B, respectively. In FIG. 8A and FIG. 8B, the vertical axes represent a luminance value, and the horizontal axes represent the image position.

FIG. 7A to FIG. 8B show that the greater the highest luminance of the light source image is, the larger the unnecessary light that looks like a double image becomes. The unnecessary light appears at the image position on the side of the optical axis (the left direction in the image) relative to the light source image. It is shown that the unnecessary light that is not noticeable in FIG. 7A is bright enough to be visible in 7B, and the captured image is adversely affected. The unnecessary light that looks like a double image corresponds to the arc-shaped flare included in the PSF shown in FIG. 2A found by the inventor.

An image processing device according to an aspect of the present invention has an object to reduce the unnecessary light component such as those shown in FIG. 7B and FIG. 8B, even when the luminance is saturated in the image captured through the optical system including the diffractive optical element. In particular, the image processing device according to embodiments of the present invention reduces the unnecessary light component in the captured image by utilizing the characteristic that large unnecessary light appears on the side of the optical axis relative to the light source image, which is the characteristic of the arc-shaped flare found by the inventor of the present invention.

Specifically, a position at which the arc-shaped flare, which is the unnecessary light having large luminance, appears is set in the captured image. Unnecessary light is estimated by using the luminance at the position and reduced. The unnecessary light in the captured image is thus reduced. The arc-shaped flare can be large unnecessary light having luminance approximately five times or ten times greater than the luminance of unnecessary order diffracted light, depending on an optical structure and an image position. Thus, compared to the image processing method in which only the unnecessary order diffracted light is removed, implementation of the present invention makes it possible to appropriately reduce the unnecessary light. Furthermore, in the captured image, a ratio of the intensity of luminance of the arc-shaped flare to the intensity of noise luminance such as white noise is greater than a ratio of unnecessary order diffracted light to the noise luminance. The arc-shaped flare can have approximately five times or ten times greater ratio than the ratio of unnecessary order diffracted light, depending on an optical structure and an image position. Thus, compared to the conventional image processing method in which unnecessary light is removed by estimating only unnecessary order diffracted light, estimation of unnecessary light based on the luminance at the particular position makes it possible to estimate unnecessary light with high accuracy with less influence from the noise luminance.

An image processing device according to an aspect of the present invention estimates unnecessary light by limiting only to the luminance at the particular position in an image, and thus can estimate the unnecessary light with a little amount of calculation.

The following describes preferable embodiments. Note that the embodiments described below show a specific, preferable example. In other words, the numerical values, shapes, materials, structural elements, the arrangement and connection of the structural elements, steps, and the processing order of the steps etc. shown in the following embodiments are given not for limiting the present invention but merely for illustrative purposes only. The scope of the present invention is defined based on the Claims. Therefore, among the structural elements in the following embodiments, structural elements not recited in any one of the independent claims defining the most generic part of the inventive concept are not necessarily required to solve the problems considered by the present invention but shall be described as a structural elements of a preferable embodiment.

(Embodiment 1)

The following describes Embodiment 1 of the present invention with reference to the drawings.

Figure 9:
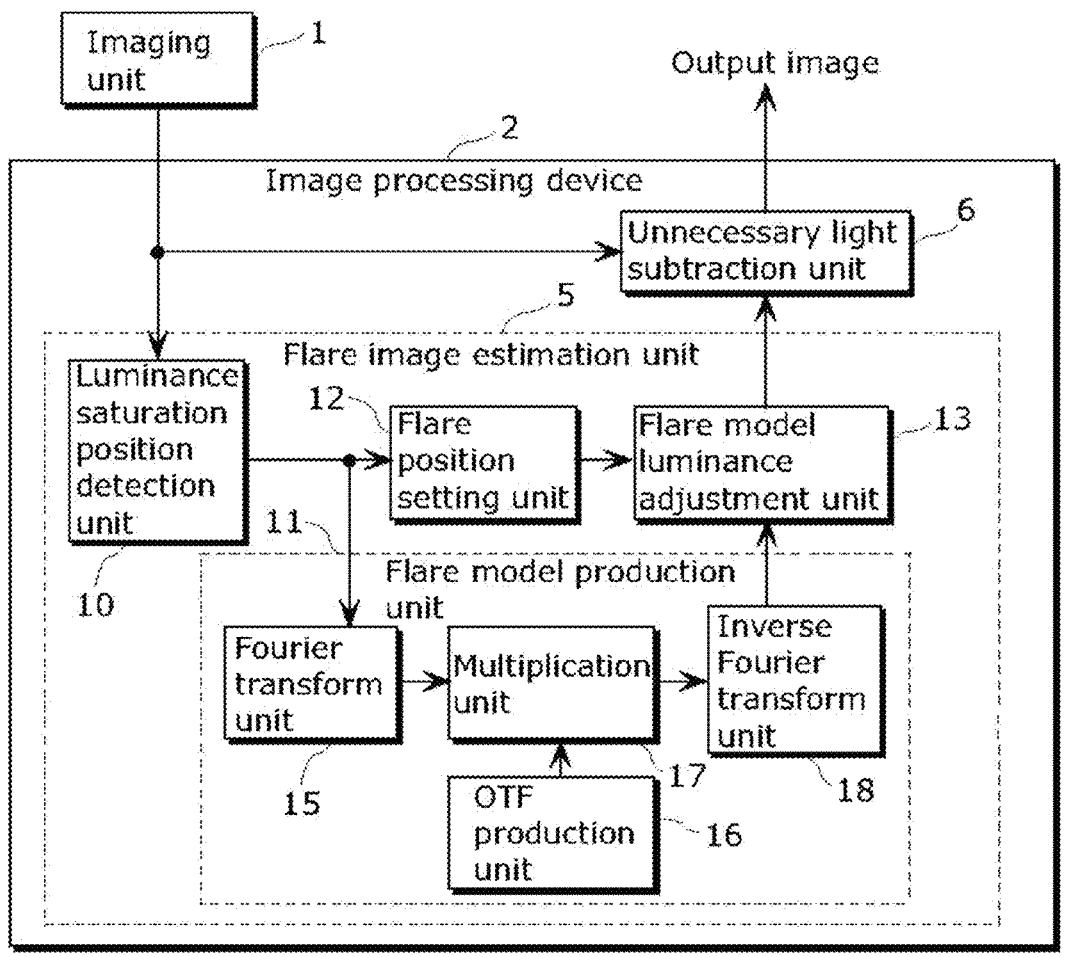
FIG. 9 is a block diagram showing a functional structure of an imaging device according to Embodiment 1 of the present invention.

FIG. 9 is a block diagram showing a functional structure of an imaging device according to Embodiment 1 of the present invention. The imaging device according to this embodiment includes an imaging unit 1 and an image processing device 2.

The imaging unit 1 produces a captured image Ir(x, y) by capturing, in an imaging device such as a CCD or a CMOS, an object image through an optical system including a diffractive optical element. Represented by "x" and "y" are a position in the vertical direction and the horizontal direction, respectively, in an image.

The image processing device 2 reduces an unnecessary light component in an image captured through the optical system including the diffractive optical element. Note that the unnecessary light component is the luminance of the image formed by unnecessary light (unnecessary light image).

As shown in FIG. 9, the image processing device 2 includes a flare image estimation unit 5 and an unnecessary light subtraction unit 6.

The flare image estimation unit 5 produces an estimated flare image If(x, y) by estimating distribution of unnecessary light included in the captured image Ir. The unnecessary light subtraction unit 6 outputs an output image Io(x, y) in which the unnecessary light component has been reduced, by subtracting the estimated flare image If from the captured image Ir.

The flare image estimation unit 5 includes: a luminance saturation position detection unit 10, a flare model production unit 11, a flare position setting unit 12, and a flare model luminance adjustment unit 13.

The luminance saturation position detection unit 10 detects, as a luminance saturation position, an image position at which the luminance value is greater than a predetermined value Isa in the captured image Ir. The predetermined value Isa may be set, for example, to 0.98 when a luminance level of black is expressed as 0 and white is expressed as 1.0. In other words, a value with which it is judged that an object is too bright and a luminance level of the captured image Ir is substantially saturated is set to the predetermined value Isa.

Then, the luminance saturation position detection unit 10 produces a light source image that indicates the thus detected luminance saturation position. Specifically, the luminance saturation position detection unit 10 produces the light source image by setting, for example, a luminance value at the luminance saturation position to an upper limit value of luminance, and setting a luminance value at the position other than the luminance saturation position to the lower limit value of luminance.

Figure 10:
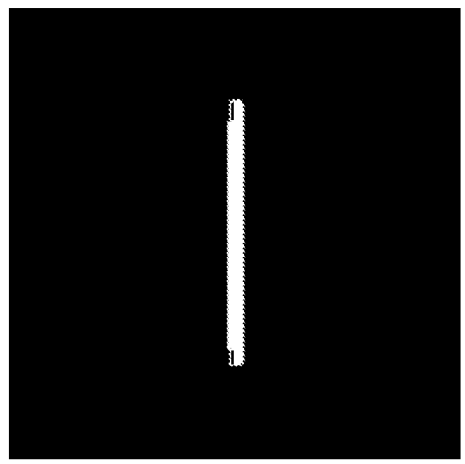
FIG. 10 is a diagram showing a light source image according to Embodiment 1 of the present invention.

FIG. 10 shows the luminance saturation position detected by the luminance saturation position detection unit 10 in the captured image Ir shown in FIG. 7B. In the light source image shown in FIG. 10, the luminance value at the image position having a saturated luminance is expressed as 1.0, and the luminance value at the other image position is expressed as 0. As with FIG. 7B, the light source image in FIG. 10 is an image at an angle of view approximately 45 degrees. In the light source image shown in FIG. 10, a side of an optical axis is the left relative to the center of the image.

The estimated flare image If is produced by using a light source image Is(x, y), which is an image that shows the luminance saturation position shown in FIG. 10 detected by the luminance saturation position detection unit 10. The luminance saturation position is a portion in which the object is shown brightly. Thus, it is reasonable to assume that the luminance saturation position is the light source, and use the luminance saturation position for the calculation to produce the estimated flare image.

Next, processing performed by the flare model production unit 11 is described. The flare model production unit 11 produces a flare model image based on the light source image and optical characteristics data of the optical system. The flare model production unit 11 includes: a Fourier transform unit 15, an OTF production unit 16, a multiplication unit 17, and an inverse Fourier transform unit 18.

Figure 11A:
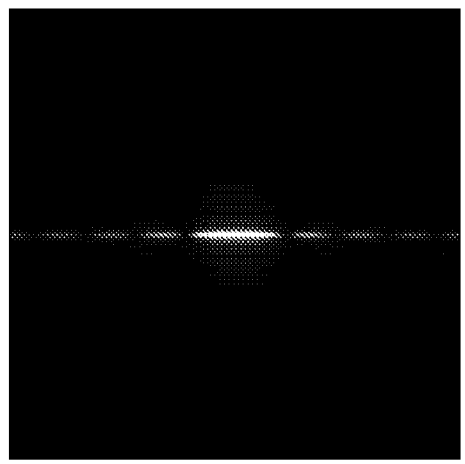
FIG. 11A is a diagram showing an amplitude spectrum of light source frequency data according to Embodiment 1 of the present invention.

The Fourier transform unit 15 Fourier transforms the light source image Is by means of a fast Fourier Transform (FFT) or the like, and output light source frequency data Fs(u, v) that is complex data. Represented by "u" and "v" are stored addresses in the vertical direction and the horizontal direction, respectively, of complex data items. Each of the stored addresses corresponds to a different frequency. FIG. 11A shows an amplitude spectrum of light source frequency data Fs that is obtained by performing the Fourier transform on the light source image Is shown in FIG. 10.

Figure 11B:
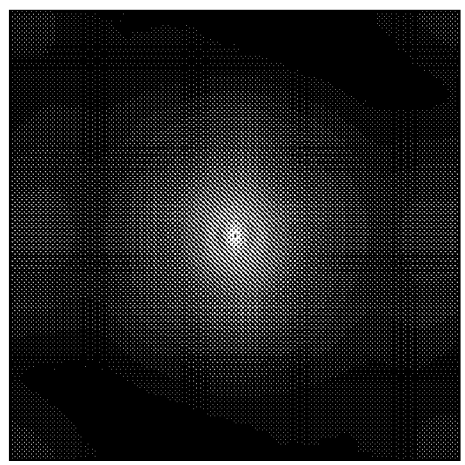
FIG. 11B is a diagram showing an amplitude spectrum of an OTF according to Embodiment 1 of the present invention.

The OTF producing unit 16 prepares optical transfer function (OTF) data Fo(u, v) that is obtained by performing the Fourier transform on the PSF according to the image position of the light source image Is. The OTF data may be produced by performing an extraction, a rotation, and the Fourier transform on the PSF, which is held for each image height in advance, according to the image position of the light source image Is. Furthermore, the OTF data may be held for each of image positions in a memory in advance. FIG. 11B shows an amplitude spectrum of OTF data Fo obtained by performing the Fourier transform on the PSF shown in FIG. 2A.

Figure 11C:
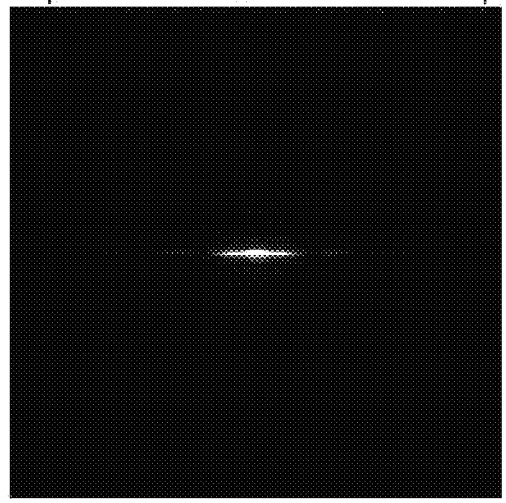
FIG. 11C is a diagram showing an amplitude spectrum of flare model frequency data according to Embodiment 1 of the present invention.

The multiplication unit 17 multiplies a complex of each of frequency components of light source frequency data Fs and OTF data Fo, and produce flare model frequency data Ffm(u, v). In other words, the multiplication unit 17 produces the flare model frequency data Ffm(u, v) by calculating the product of light source frequency data Fs and OTF data Fo for each of the frequencies. FIG. 11C shows an amplitude spectrum of the flare model frequency data Ffm.

Due to a blur that is expressed in PSF and resulted from the optical system, amplitude in high frequency region of the flare model frequency data Ffm shown in FIG. 11C is smaller compared to the light source frequency data Fs shown in FIG. 11A. Note that in FIG. 11A and FIG. 11C, the brightness of each of the amplitude spectrums is adjusted by applying the same gain to the actual values so that the amplitude spectrums is more visible.

Figure 12:
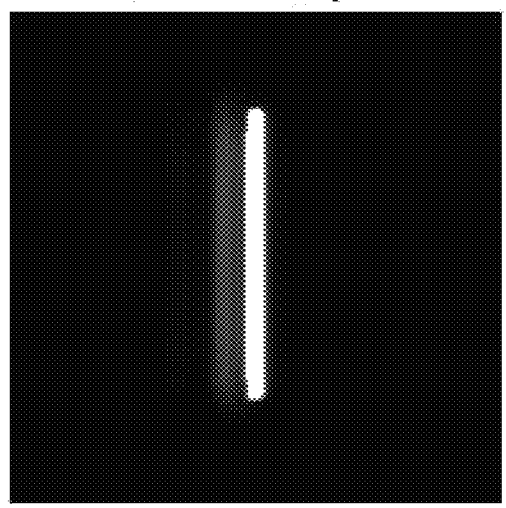
FIG. 12 is a diagram showing a flare model image according to Embodiment 1 of the present invention.
Figure 13:
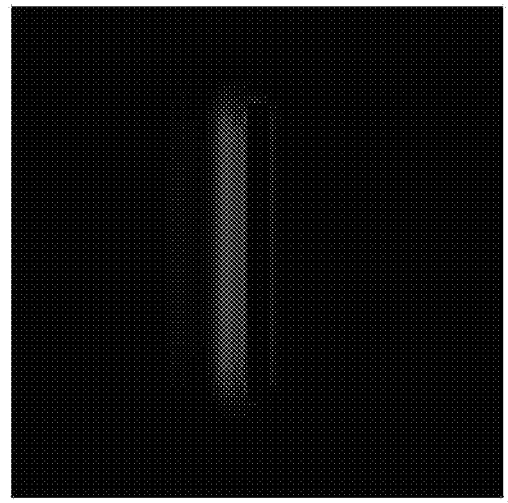
FIG. 13 is a diagram showing a flare model image according to Embodiment 1 of the present invention.

The inverse Fourier transform unit 18 performs inverse Fourier transform on the flare model frequency data Ffm to produce flare model image Ifm'(x, y). FIG. 12 shows the flare model image Ifm'. Furthermore, the inverse Fourier transform unit 18 produces the flare model image Ifm by changing, in the flare model image Ifm', the luminance at the luminance saturation position (light source) in the captured image Ir to zero. The flare model image Ifm corresponds to an image which includes only the unnecessary light component of the flare model image Ifm'. FIG. 13 shows the flare model image Ifm.

As described, the flare model production unit 11 estimates the flare model image Ifm that includes the unnecessary light component resulted from the diffraction grating. When the luminance of a luminance saturation portion (light source) of the captured image Ir is saturated, the actual luminance of the luminance saturation portion cannot be seen. Thus, the absolute value of the luminance value of the unnecessary light component is not known. In view of the above, the flare model production unit 11 produces the flare model image Ifm by estimating a relative luminance distribution of the unnecessary light component.

Note that the unnecessary light component in the flare model image Ifm can appear outside the size of the light source image Is, when the image position of the light source (the image position at which luminance is 1) is near the edge of the image in the light source image Is. Thus, the flare model production unit 11 appropriately adjusts the image size and performs calculation. For example, the flare model production unit 11 increases the size of the light source image Is by adding in the surrounding area the image region at which the luminance is 0.

Furthermore, although the flare model production unit 11 performs calculation in a frequency domain, the flare model production unit 11 may perform an equivalent calculation as the above-described calculation in the frequency domain by performing convolution integral in a spatial domain. In other words, the flare model production unit 11 may produce the flare model image Ifm' by performing a convolution integral on the light source image Is and the PSF. In this case, the flare model production unit 11 does not have to include: the Fourier transform unit 15, the OTF production unit 16, the multiplication unit 17, and the inverse Fourier transform unit 18. Note that, in this embodiment, the flare model production unit 11 performs calculation in the frequency domain in light of superiority in calculation time.

Next, the flare position setting unit 12 sets, using the luminance saturation position which is already detected by the luminance saturation position detection unit 10, a flare position (xf, yf) that is a position known in advance to have locally large unnecessary light, based on the fact that the large unnecessary light locally appears on the optical axis side relative to the light source position, when an image is captured using the optical system including the diffraction grating. In other words, the flare position setting unit 12 sets, as the flare position, a predetermined image position, which is an image position in the captured image and located near the luminance saturation position and on a side of the optical axis relative to the luminance saturation position.

In this embodiment, the flare position is an image position which corresponds to a position predetermined as a position having strong unnecessary light in the PSF that is an example of optical characteristics data of the optical system. Specifically, the flare position is an image position which is in the captured image and away from the luminance saturation position to the side of the optical axis by a distance specified by the position predetermined as the position having the strong unnecessary light in the PSF. Note that the position predetermined as the position having large unnecessary light in the PSF is, for example, a peak position of the luminance values of unnecessary light. The peak position is located near the position at which the luminance is highest.

Figure 14:
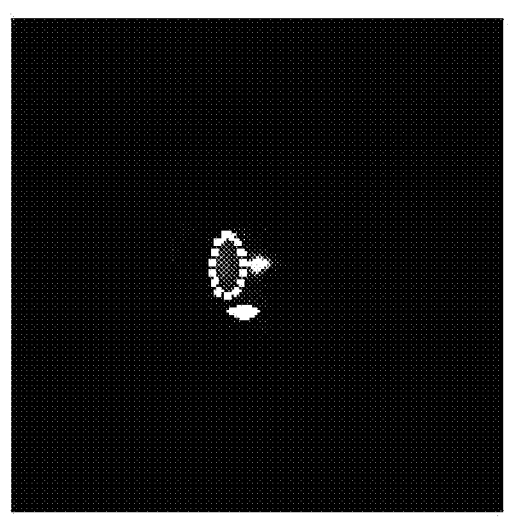
FIG. 14 is a diagram showing a PSF of an optical system according to Embodiment 1 of the present invention.

FIG. 14 shows the PSF of the optical system according to Embodiment 1 of the present invention at an angle of view approximately 45 degrees. Note that in the PSF shown in FIG. 14, the luminance is adjusted so that the luminance distribution can be seen easily (the same PSF as shown in FIG. 2B). Furthermore, in the PSF shown in FIG. 14, the number of pixels in each of the vertical direction and the horizontal direction is 256 pixels.

Large unnecessary light resulted from the diffraction grating included in the optical system appears in the region (the region circled by a dotted line in FIG. 14) approximately 16 pixels away to the side of the optical axis (on the left relative to the center of the image) from the image position at which the luminance is highest in the PSF.

Figure 15A:
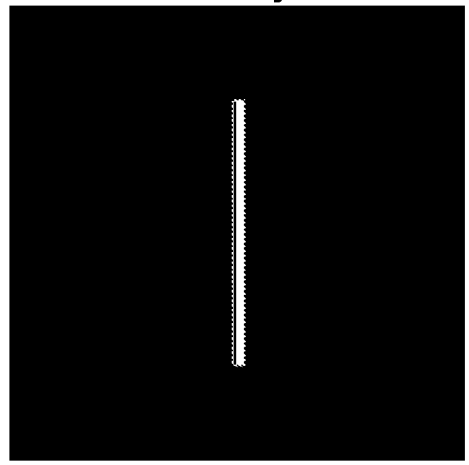
FIG. 15A is a diagram showing a first object according to Embodiment 1 of the present invention.
Figure 15B:
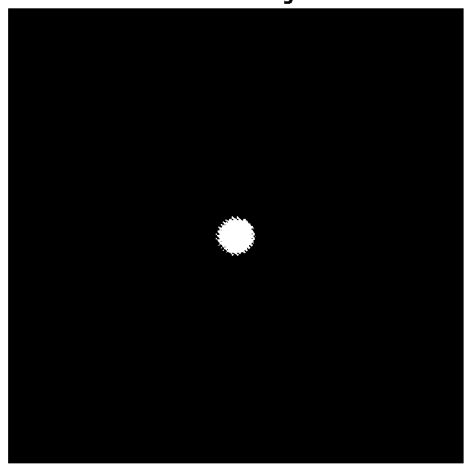
FIG. 15B is a diagram showing a second object according to Embodiment 1 of the present invention.

FIG. 15A and FIG. 15B show objects that are captured through the optical system having as optical characteristics data the PSF shown in FIG. 14. FIG. 15A shows a first object, and FIG. 15B shows a second object.

The first object is an object schematically produced assuming a rectangular-shaped light source (e.g., fluorescent lamp). Furthermore, the second object is an object schematically produced assuming a round-shaped light source. Note that the object shown in FIG. 15A is identical to the object shown in FIG. 6.

Figure 16A:
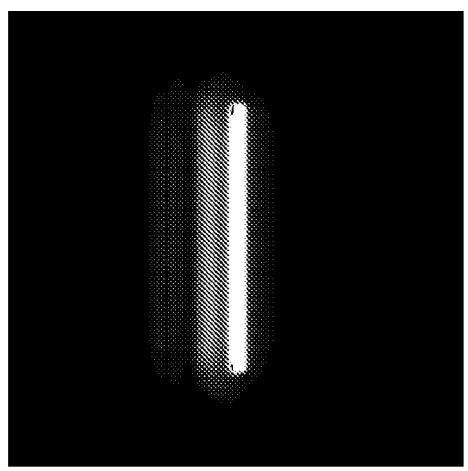
FIG. 16A is a diagram showing a captured image of the first object according to Embodiment 1 of the present invention.
Figure 16B:
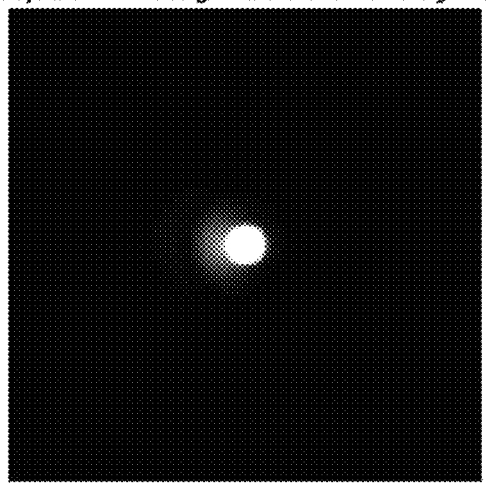
FIG. 16B is a diagram showing a captured image of the second object according to Embodiment 1 of the present invention.

FIG. 16A and FIG. 16B show the captured images Ir which capture the object shown in FIG. 15A and FIG. 15B, respectively. In the captured images shown in FIG. 16A and FIG. 16B, it is assumed that the PSF does not vary significantly over the entire region.

The captured images shown in FIG. 16A and FIG. 16B are simulated images produced by performing convolution integral on the PSF shown in FIG. 2A and each of the objects shown in FIG. 15A and FIG. 15B, respectively. Note that the luminance is saturated at the image position showing the object because the object is bright. Furthermore, large unnecessary light appears on the side of the optical axis (on the left relative to the center of the image) relative to the image position at which the luminance is saturated.

Figure 17A:
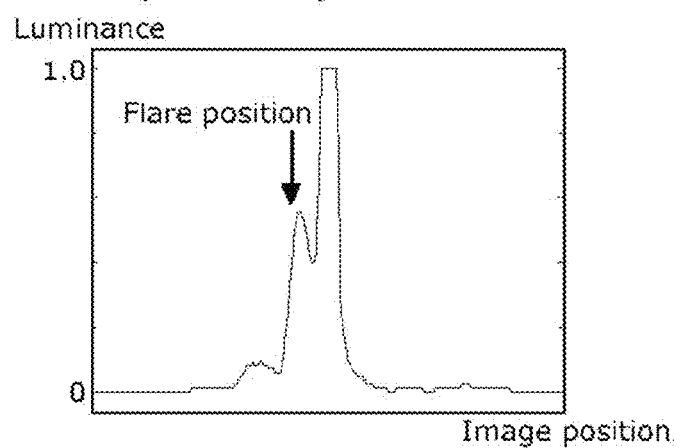
FIG. 17A is a diagram showing a luminance transition of the captured image of the first object according to Embodiment 1 of the present invention.
Figure 17B:
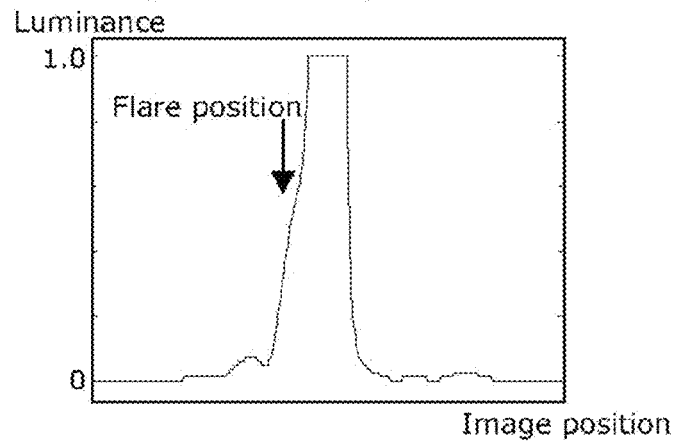
FIG. 17B is a diagram showing a luminance transition of the captured image of the second object according to Embodiment 1 of the present invention.

FIG. 17A and FIG. 17B show the transition of luminance in the horizontal direction near the center of the image of the captured images Ir shown in FIG. 16A and FIG. 16B, respectively. FIG. 17A and FIG. 17B show that, with any of the objects, large unnecessary light appears at the position approximately 16 pixels away to the side of the optical axis from the image position at which saturation occurs (positions indicated by arrows in FIG. 17A and FIG. 17B).

The greater the width of the light source in the captured image is, the peak position of the luminance value of unnecessary light tends to be nearer to the image position at which luminance is saturated. However, at the image position approximately 16 pixels away to the side of the optical axis from the light source that is the position at which the large unnecessary light appears in the PSF, in the captured images as well, large unnecessary light always appears in the captured image regardless of objects though the position is sometimes a little off from the peak position of the unnecessary light.

Therefore, the flare position setting unit 12 sets, as the flare position (xf, yf), the image position which is known in advance to have large unnecessary light and away to the side of the optical axis from the luminance saturation position by a flare distance Df. In other words, the flare position setting unit 12 sets, as the flare position, the position which is in the captured image and predetermined distance (the flare distance Df) away to the side of the optical axis from the luminance saturation position.

Here, the flare distance Df is predetermined to be 16 pixels that is the distance between the light source position and the peak position of the luminance value of unnecessary light in the PSF. Note that the flare distance Df may be set to be slightly smaller than the distance between the light source position and the peak position of the luminance value of unnecessary light in the PSF (e.g., 13 pixels), considering the aforementioned fact that the greater the width of the light source, the peak position of unnecessary light becomes nearer to the image position of the light source. In such a case, the peak position of the unnecessary light may be determined through trial and error based on an experiment and a simulation using an assumed object.

The flare model luminance adjustment unit 13 produces the estimated flare image If(x, y) by adjusting the luminance value of the flare model image Ifm, based on the relationship between the luminance Ir(xf, yf) of the captured image and the luminance Ifm(xf, yf) of the flare model image at the flare position (xf, yf). Specifically, the flare model luminance adjustment unit 13 adjusts the gain of the flare model image Ifm such that the luminance of the estimated flare image If at the flare position (xf, yf) is Nf times (Nf<1) the luminance Ir(xf, yf) of the captured image at the flare position (xf, yf), and produces the estimated flare image If. More specifically, the flare model production unit 11 produces the estimated flare image If, for example, according to Equation (2).

[Math 2]

$$If(x, y) = \frac{Nf \cdot Ifm(x, y) \cdot Ir(xf, yf)}{Ifm(xf, yf)} \quad \text{(Equation 2)}$$

In other words, in this embodiment, the relationship between the luminance value of the captured image at the flare position and the luminance value of the flare model image at the flare position corresponds to a ratio between the luminance value of the captured image and the luminance value of the flare model image. In other words, in this embodiment, the flare model luminance adjustment unit 13 adjusts the gain of the luminance of the flare model image by using a ratio between the luminance value of the captured image at the flare position and the luminance value of the flare model image at the flare position.

Figure 18A:
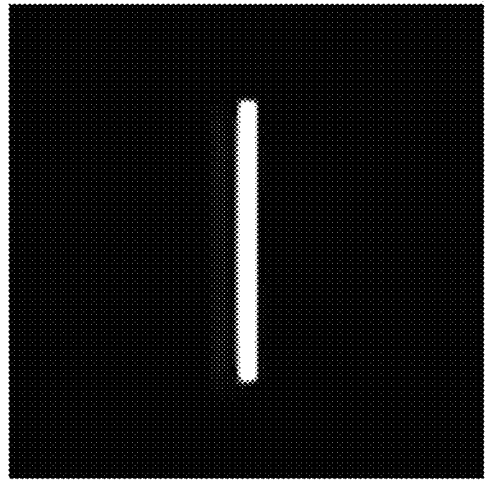
FIG. 18A is a diagram showing an output image of the first object according to Embodiment 1 of the present invention.
Figure 18B:
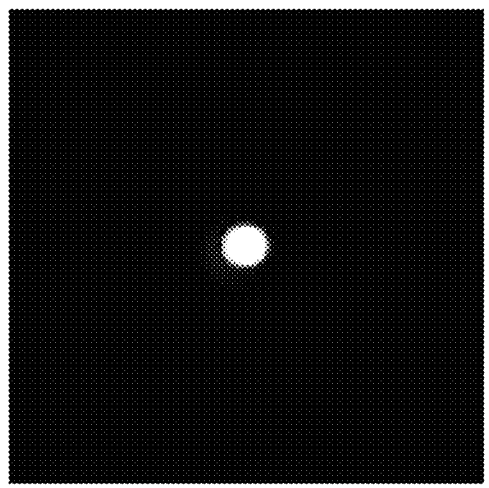
FIG. 18B is a diagram showing an output image of the second object according to Embodiment 1 of the present invention.

The unnecessary light subtraction unit 6 obtains an output image Io in which an unnecessary light component has been reduced, by subtracting the thus obtained estimated flare image If from the captured image Ir. FIG. 18A shows the output image Io, which is an image obtained by reducing the unnecessary light component in the image in which the first object is captured. Furthermore, FIG. 18B shows the output image Io, which is an image obtained by reducing the unnecessary light component in the image in which the second object is captured. Here, Nf is set to 0.8.

Figure 19A:
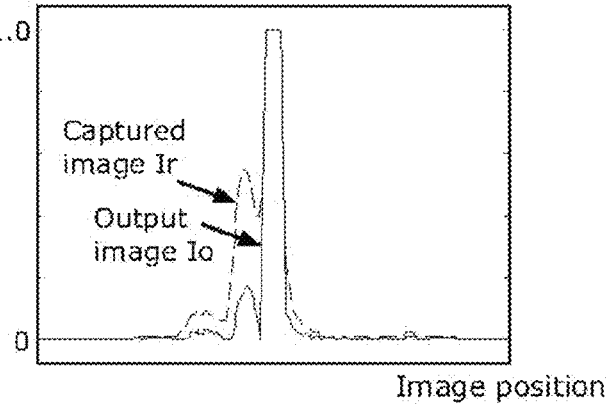
FIG. 19A is a diagram showing a luminance transition of the output image of the first object according to Embodiment 1 of the present invention.
Figure 19B:
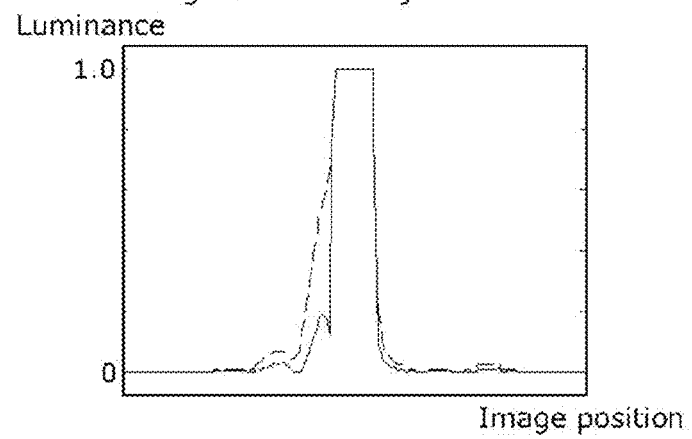
FIG. 19B is a diagram showing a luminance transition of the output image of the second object according to Embodiment 1 of the present invention.

FIG. 19A and FIG. 19B show the luminance transition in the horizontal direction of the image near the center of the output image Io shown in FIG. 18A and FIG. 18B, respectively. In FIG. 19A and FIG. 19B, the solid lines show the luminance transition of the output image Io and the dotted lines show the luminance transition of the captured image Ir. The first object and the second object have mutually different widths. However, on any of the objects, unnecessary light is significantly reduced.

Figure 20A:
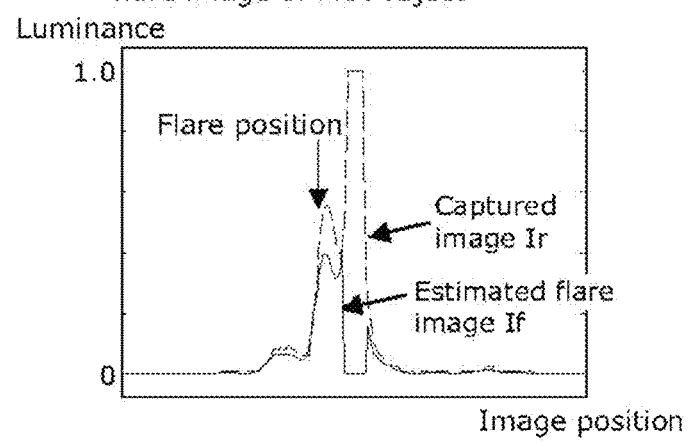
FIG. 20A is a diagram showing a luminance transition of an estimated flare image of the first object according to Embodiment 1 of the present invention.
Figure 20B:
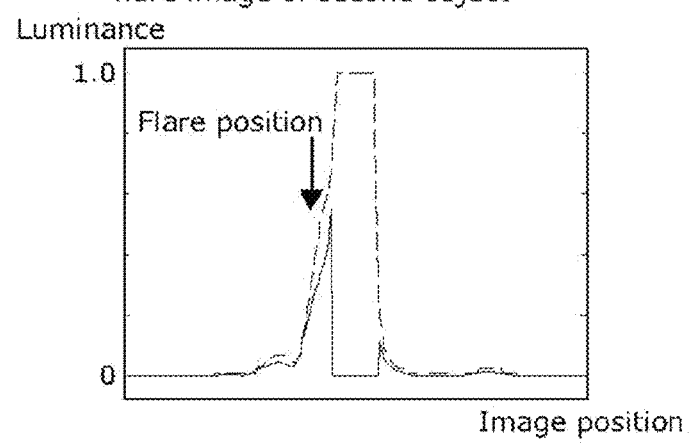
FIG. 20B is a diagram showing a luminance transition of an estimated flare image of the second object according to Embodiment 1 of the present invention.

Each of FIG. 20A and FIG. 20B shows luminance transition of the estimated flare image If. The solid line shows the luminance transition of the estimated flare image If and the dotted line shows the luminance transition of the captured image Ir. Here, since it is Nf=0.8, the luminance If(xf, yf) of the estimated flare image at the flare position pointed by an arrow is 0.8 times the luminance Ir(xf, yf) of the captured image.

Note that the luminance distribution of the actual unnecessary light included in the captured image Ir do not precisely match the luminance distribution of the estimated flare image If. This is because there is a little difference between the shape of the actual light source and the shape of the luminance saturation position assumed to be the light source in this embodiment. Therefore, when Nf is set to 1.0, excessive correction of unnecessary light is performed in some region because of the difference between the luminance distribution of the actual unnecessary light and the luminance distribution of the estimated flare image. Thus, it is preferable that Nf be Nf<1.0.

The degree of difference between the luminance distribution of the actual unnecessary light and the luminance distribution of the estimated flare image is different depending on the shooting environment of the images. Thus, it is preferable that Nf be set to approximately 0.2 to 0.8 in view of the risk of excessive correction. In other words, it is preferable that the flare model luminance adjustment unit 13 adjust the gain of the luminance of the flare model image such that the luminance value of the estimated flare image at the flare position is 0.2 to 0.8 times the luminance value of the captured image at the flare position. Although the effect in reducing unnecessary light decreases with a smaller Nf, unnecessary light is significantly reduced as compared to the captured image as long as the Nf is set in a range described above.

As described above, with the image processing device or the imaging device according to this embodiment, it is possible to appropriately adjust the gain of the luminance of the flare model image at the image position having large unnecessary light that is characteristic of the diffraction grating, by comparing the luminance value of the captured image and the luminance value of the flare model image. Thus, the estimated flare image can be produced with high accuracy. The thus produced estimated flare image is subtracted from the captured image. With this, the unnecessary light in the captured image obtained by one shooting can be appropriately reduced, even when the luminance of the captured image is saturated.

In other words, with the image processing device or the imaging device according to this embodiment, it is possible to reduce the component of arc-shaped large unnecessary light in the captured image, which is found by the inventor of the present invention to appear when the optical system including the diffractive optical element is used. The large, arc-shaped unnecessary light depends on optical characteristics of the optical system including the diffractive optical element. As long as the optical characteristics of the optical system do not change, change in object does not cause a significant difference in the distance between the image position having high luminance and the image position at which unnecessary light appears in the captured image. Therefore, the image of unnecessary light can be estimated with high accuracy even when the luminance of the captured image is saturated, by adjusting the gain of the luminance of the flare model image based on the luminance value of the flare position that is the image position which corresponds to the position at which the large unnecessary light appears in the PSF of the optical system.

Note that although only the unnecessary light reduction processing at an angle of view approximately 45 degrees of the captured image Ir has been described in this embodiment, when the processing is performed on the entire actual image, the image processing device 2 may, for example, divide the image into square blocks and perform the above-described image processing for each of the blocks. When the size of the block is such that the number of pixels in the each of vertical direction and the horizontal direction is factorial of 2 such as 64 pixels to allow application of FFT calculation, fast calculation is possible. Alternatively, the flare image estimation unit 5 may obtain the estimated flare image If for each block, and the unnecessary light subtraction unit 6 may lastly perform unnecessary light subtraction processing for the entire image collectively.

At this time, the image processing device 2 may prepare and store in a memory OTF data Fo for each block assuming that the PSF does not vary significantly in each block. In this way, the calculation for image processing can be performed at high speed. Further, there is no need for reduction of unnecessary light in a block having no luminance saturation position, and thus the luminance saturation position detection unit 10 may skip unnecessary calculation for such a block. In this way, the calculation for image processing can be performed at higher speed.

Note that it is apparent that the flare distance Df, which is used to set the flare position (xf, yf), is set according to the arc-shaped flare of the PSF in the respective block because the PSF is different for each block. The flare distance Df may be set for each block or each image position at the time when the imaging device is shipped from the factory or may be obtained by detecting the position of the arc-shaped flare from the PSF every time when images are captured.

Figure 21:
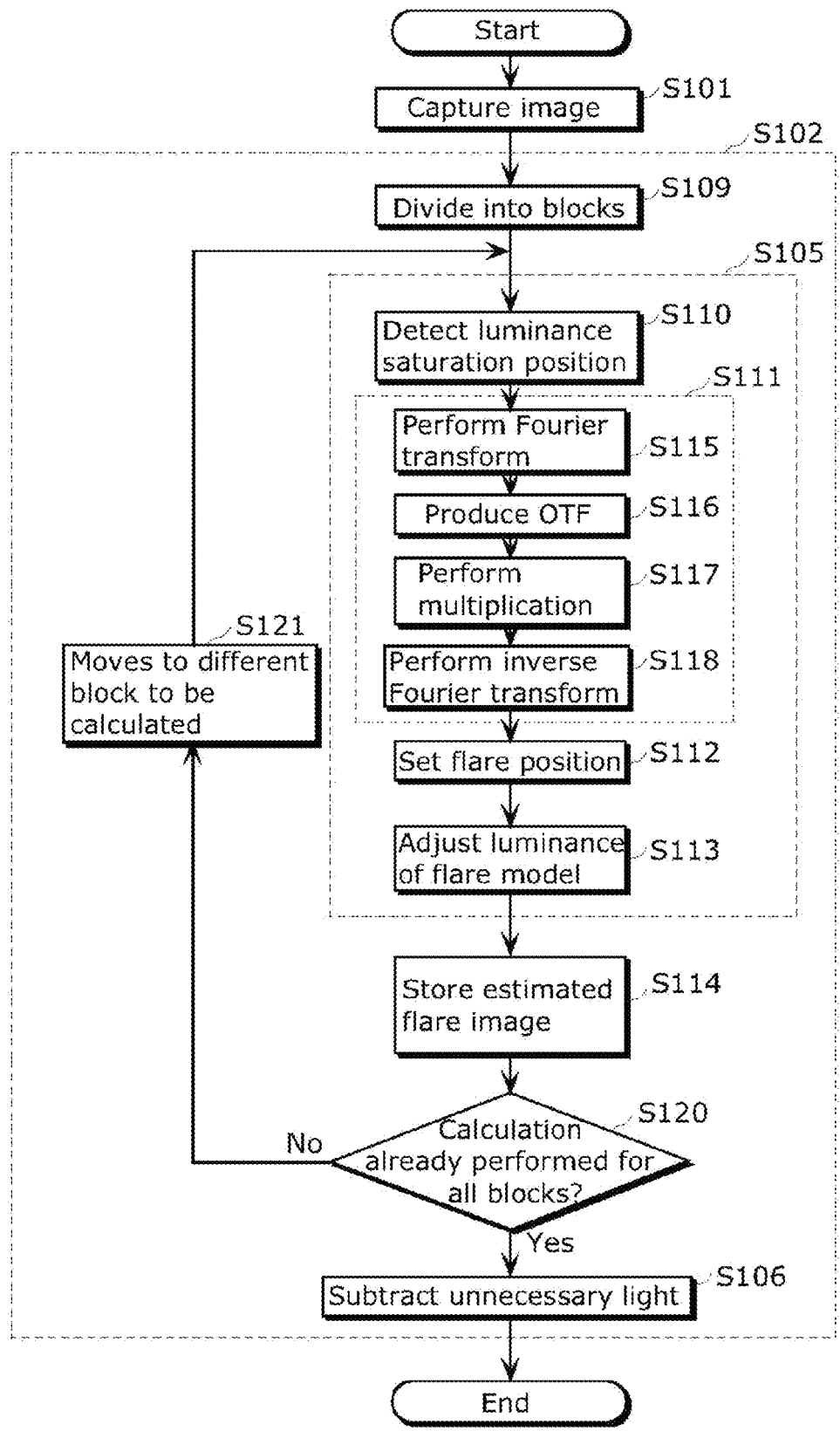
FIG. 21 is a flowchart showing processing performed by the imaging device according to Embodiment 1 of the present invention.

FIG. 21 shows an example of a flowchart showing operations performed by the imaging device according to Embodiment 1 of the present invention. Specifically, FIG. 21 is a flowchart showing processing performed to produce the estimated flare image for each block.

In an image capture Step S101, the imaging unit 1 produces the captured image Ir. In unnecessary light reduction Step S102, the image processing device 2 outputs the output image Io that is an image obtained by reducing the unnecessary light in the captured image Ir.

In block division Step S109 included in the unnecessary light reduction Step S102, the image processing device 2 divides the captured image Ir into blocks in such a manner that the PSF does not significantly vary in each of the blocks. For example, the captured image Ir may be divided into square blocks each having 64 pixels in each of the vertical direction and the horizontal direction. In flare image estimation Step S105, the flare image estimation unit produces the estimated flare image If for each block.

In luminance saturation position detection Step S110 included in the flare image estimation Step S105, the luminance saturation position detection unit 10 detects the image position at which the luminance is saturated for each block in the captured image Ir, and produces the light source image Is. In flare model production Step S111, the flare model production unit 11 produces the flare model.

Specifically, in Fourier transform Step S115, the Fourier transform unit 15 performs Fourier transform on the light source image Is to produce light source frequency data Fs. In OTF production Step S116, the OTF production unit 16 produces OTF data Fo. In multiplication Step S117, the multiplication unit 17 produces the flare model frequency data Ffm by multiplying the light source frequency data Fs by OTF data Fo. Furthermore, in inverse Fourier transform Step S118, the inverse Fourier transform unit 18 performs inverse Fourier transform on the flare model frequency data Ffm to produce the flare model image Ifm.

In flare position setting Step S112, the flare position setting unit 12 sets the flare position (xf, yf). In flare model luminance adjustment Step S113, the flare model luminance adjustment unit 13 produces the estimated flare image If according to Equation (2). Note that flare position setting Step S112 may be performed before flare model production Step S111 is performed. Furthermore, the flare model production Step S111 and flare position setting Step S112 may be processed in parallel with each other.

In estimated flare image storing Step S114, the flare image estimation unit 5 stores in a memory or the like the produced estimated flare image If as the estimated flare image of the block for which the calculation has been performed. Note that, when the luminance saturation position was not found in a block in luminance saturation position detection Step S110, the image processing device 2 may skip processing from the Step S110 to Step S114, regard that the flare model image Ifm for the block is already produced (unnecessary light component is 0), and proceed to Step S120.

When it is determined in Step S120 that there is a block for which the production processing of the estimated flare image If is yet to be performed, in a calculation block moving Step S121, the image processing device 2 moves to a different block position, and produces the estimated flare image If for the different block. When it is determined in Step S120 that the estimated flare image If is already produced for all the blocks, in unnecessary light subtraction Step S106, the unnecessary light subtraction unit 6 subtracts the estimated flare images If of all the blocks from the captured image Ir to produce the output image Io.

Note that the inverse Fourier transform unit 18 produces, from the flare model image Ifm', the flare model image Ifm which includes only the unnecessary light component of the flare model image, by changing the luminance of the luminance saturation position (light source) of the captured image Ir to zero. However, the inverse Fourier transform unit 18 need not necessarily set, in the flare model image Ifm', the luminance at the luminance saturation position (light source) of the captured image Ir to zero. This processing indicates that the subtraction of unnecessary light is not performed at the luminance saturation position of the captured image Ir. Therefore, it may be that the inverse Fourier transform unit 18 does not change, in the flare model image Ifm', the luminance of the luminance saturation position (light source) of the captured image Ir to zero and the unnecessary light subtraction unit 6 skip subtraction of the estimated flare image If at the luminance saturation position (light source) of the captured image Ir. In this case, it is Ifm=Ifm'. In other words, the image processing device 2 may have any structure with which unnecessary light is not subtracted at the luminance saturation position of the captured image Ir.

Note that the inverse Fourier transform unit 18 skips subtraction of unnecessary light from the flare model image Ifm' at the luminance saturation position, by changing the luminance at the luminance saturation position of the captured image Ir to zero. However, the inverse Fourier transform unit 18 may further skip subtraction of unnecessary light in the surrounding area of the luminance saturation position in the captured image Ir within a width of a few pixels from the luminance saturation position. In other words, the unnecessary light subtraction unit 6 may skip subtracting, from the captured image, the estimated flare image at the image position adjacent to the luminance saturation position and within a width of a predetermined number of pixels from the luminance saturation position. More specifically, the unnecessary light subtraction unit 6 may subtract the estimated flare image from the captured image only at the image position that is away from the luminance saturation position by the predetermined number of pixels or more.

This is because the luminance saturation position of the captured image Ir is assumed to be the light source and there can be a case in which the shape of the actual light source is smaller than the assumed shape of the light source. In this case, in the surrounding area of the luminance saturation position, the luminance of the estimated flare image If can be greater than the actual luminance and the unnecessary light can be excessively reduced. The image processing device 2 can obtain more natural output image by avoiding excessive correction of unnecessary light, by skipping subtraction of unnecessary light in the entire periphery within a width of a few pixels (e.g., one to three pixels) from the luminance saturation position of the captured image Ir. In this embodiment, subtraction of unnecessary light is skipped in the entire periphery within a width of two pixels from the luminance saturation position.

Furthermore, as another method of avoiding excessive reduction of unnecessary light due to the difference between the actual shape of the light source and the shape of the estimated light source, the luminance saturation position detection unit 10 may produce, as a new light source image Is, a light source image which is smaller in size by shrinking a periphery of the shape of the light source estimated from the luminance saturation position. This will be detailed in Embodiment 2 and thus the details are omitted here.

Note that although this embodiment describes the method for reducing unnecessary light in the white and black image, it is apparent that the above-described method for reducing the unnecessary light can also be applied to color images. When the captured image is a color image, the image processing device 2 may produce the estimated flare image If for one of the colors from among red (R), green (G), and blue (B) and adjust, according to a ratio of unnecessary light for each of colors of R, G, and B calculated separately, the gain of the estimated flare image If for each color. For example, the flare image estimation unit 5 produces an estimated flare image If_g for G. At this time, when it is predetermined that the ratio of unnecessary light of R, G, and B is approximately 0.8:1.0:0.6, the flare image estimation unit 5 produces the estimated flare image of R and B as 0.8*If_g and 0.6*If_g, respectively. Then, the unnecessary light subtraction unit 6 may subtract the estimated flare images of R, G, and B from the images for R, G, and B of the captured image Ir, respectively. Note that the flare image estimation unit 5 may separately obtain the estimated flare image for each of R, G, and B. However, in this case, a PSF needs to be prepared for each of R, G, and B, and calculation time also increases. Therefore, the flare image estimation unit 5 can suppress increase in memory capacity or calculation time, by producing, based on the estimated flare image for one of the colors of R, G, and B, the estimated flare image for other colors from among R, G, and B.

Note that, to obtain the PSF shown in FIG. 14 and FIG. 2A, the PSF including the arc-shaped unnecessary light may be obtained by actually capturing a point light source by using the optical system of the imaging unit 1. Alternatively, the PSF including the arc-shaped unnecessary light may be obtained by simulating a structure of the optical system.

(Embodiment 2)

The following describes Embodiment 2 of the present invention with reference to the drawings. The structure of an imaging device according to this embodiment is identical to the structure shown in FIG. 9. However, in this embodiment, the processing performed by the flare position setting unit 12 and the flare model luminance adjustment unit 13 is different from the processing performed according to Embodiment 1. Thus, the following describes mainly the processing performed by the flare position setting unit 12 and the flare model luminance adjustment unit 13. Other processing is the same as the processing performed according to Embodiment 1 and thus the detailed descriptions thereof are omitted.

Figure 22A:
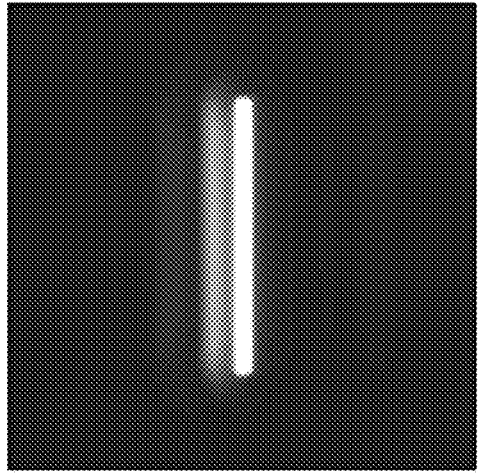
FIG. 22A is a diagram showing a captured image of a first object according to Embodiment 2 of the present invention.
Figure 22B:
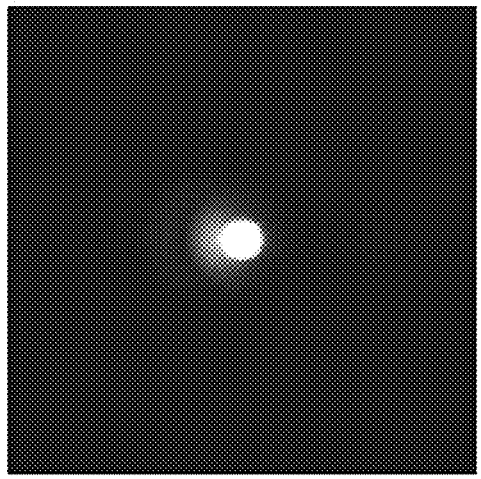
FIG. 22B is a diagram showing a captured image of a second object according to Embodiment 2 of the present invention.

Each of FIG. 22A and FIG. 22B show captured image Ir(x, y) used in this embodiment. The captured images shown in FIG. 22A and FIG. 22B are simulated images that are produced based on the PSF shown in FIG. 2A and objects shown in FIG. 15A and FIG. 15B. FIG. 22A shows the captured image Ir of the first object, and FIG. 22B shows the captured image Ir of the second object.

The first object is an object schematically produced assuming a rectangular-shaped light source (e.g., fluorescent lamp). Furthermore, the second object is an object schematically produced assuming a round-shaped light source.

Figure 23A:
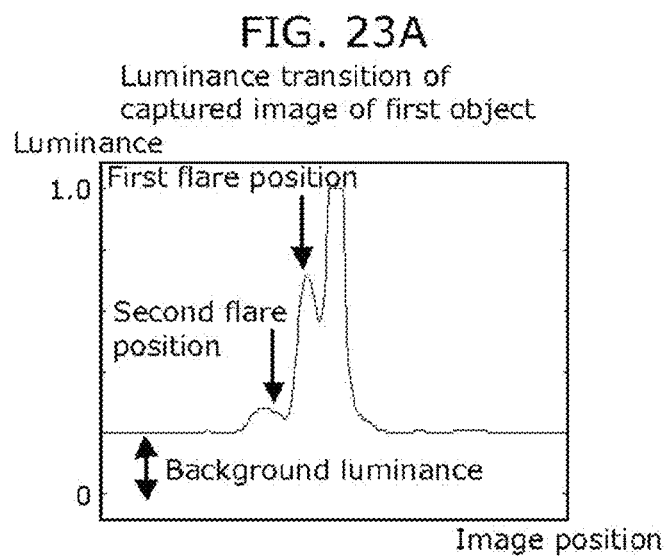
FIG. 23A is a diagram showing a luminance transition of the captured image of the first object according to Embodiment 2 of the present invention.
Figure 23B:
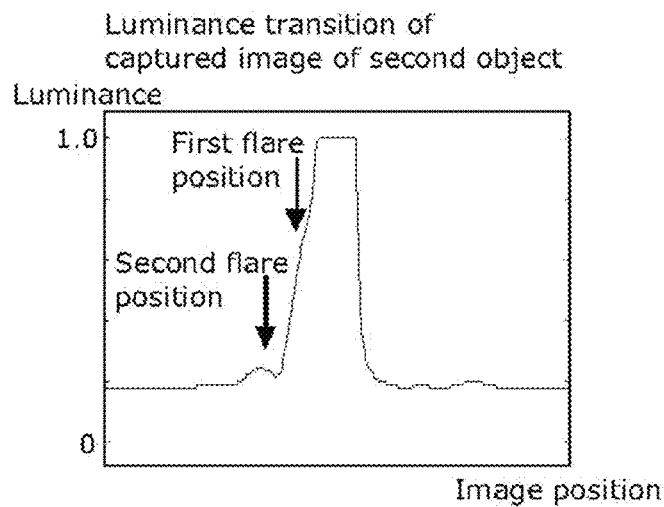
FIG. 23B is a diagram showing a luminance transition of the captured image of the second object according to Embodiment 2 of the present invention.

FIG. 23A and FIG. 23B show luminance transition in the horizontal direction of the image near the center of the image of the captured images Ir of the first object and the second object shown in FIG. 22A and FIG. 22B, respectively. In FIG. 22A and FIG. 22B, FIG. 23A, and FIG. 23B, images in the background of the rectangular-shaped light source and the round-shaped light source has a luminance of approximately 0.2. The image processing device 2 according to this embodiment can appropriately reduce the unnecessary light around the light source, even when there is a wall or the like in the back of the light source and thus the background image has luminance. Here, too, the captured image shown in FIG. 22A and FIG. 22B are images in which the first object and the second object are captured at an angle of view approximately 45 degrees, respectively.

The flare position setting unit 12 according to this embodiment sets a flare position, which is an image position at which large unnecessary light locally appears in the optical system including a diffraction grating, based on the optical characteristics data of the optical system. Specifically, the flare position setting unit 12 sets a first flare position (xf1, yf1) and a second flare position (xf2, yf2) based on the luminance saturation position.

Here, the first flare position (xf1, yf1) is an image position known in advance to have locally large unnecessary light in the PSF. Furthermore, the second flare position (xf2, yf2) is an image position known in advance to have small unnecessary light in the PSF. In other words, the flare position setting unit 12 sets, as the flare positions, (i) an image position which is near the luminance saturation position and corresponds to a first position, and (ii) an image position corresponding to a second position, the first position being predetermined as a position having strong unnecessary light in a PSF corresponding to the luminance saturation position, and the second position being predetermined in the PSF as a position having unnecessary light weaker than the unnecessary light at the first position.

Figure 24:
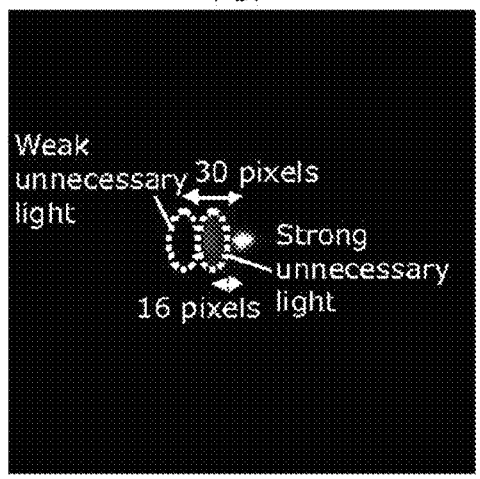
FIG. 24 is a diagram showing a PSF of an optical system according to Embodiment 2 of the present invention.

FIG. 24 shows a PSF at an angle of view approximately 45 degrees of the optical system according to Embodiment 2 of the present invention (the same PSF as shown in FIG. 2B). At the image positions in the captured images shown in FIG. 22A and FIG. 22B, it is assumed that the PSF does not vary significantly over the entire region. In the PSF shown in FIG. 24, the number of pixels in each of the vertical direction and the horizontal direction is 256 pixels.

The large unnecessary light resulted from the diffraction grating included in the optical system appears in the region approximately 16 pixels away to the side of the optical axis (region on the right out of the regions circled by the dotted lines in FIG. 24) from the image position having the highest luminance in the PSF. Furthermore, in the region about 30 pixels away to the side of the optical axis (region on the left out of the regions circled by the dotted lines in FIG. 24) from the image position having the highest luminance, there is a region where unnecessary light is significantly small. In the PSF of the optical system including the diffraction grating, the region in which the intensity of unnecessary light dramatically change as described above exists on the side of the optical axis relative to the image position having the highest luminance.

Therefore, the flare position setting unit 12 sets, as the first flare position (xf1, yf1), the image position which is away from the luminance saturation position in the captured image Ir by the flare distance Df1 to the side of the optical axis and has large unnecessary light. Furthermore, the flare position setting unit 12 sets, as the second flare position (xf2, yf2), the image position which is away from the luminance saturation position in the captured image Ir by the flare distance Df2 to the side of the optical axis and has small unnecessary light.

Here the flare distance Df1 is set to 13 pixels, and the flare distance Df2 is set to 30 pixels. Since the flare distance Df2 may be set at the image position having small unnecessary light, a value greater than 30 pixels may be set as the flare distance Df2.

As FIG. 23A and FIG. 23B show, even when the object is changed, the large unnecessary light appears at the image position at the flare distance Df1, and the unnecessary light which appears at the image position at flare distance Df2 is significantly small compared to the unnecessary light at the image position at the flare distance Df1.

Next, the flare model luminance adjustment unit 13 according to this embodiment produces the estimated flare image If(x, y) by adjusting the luminance of the flare model image Ifm by using the luminance of the captured image Ir and the luminance of the flare model image Ifm at each of the first flare position and the second flare position that are set by the flare position setting unit 12.

Specifically, the flare model luminance adjustment unit 13 adjusts the gain of the luminance of the flare model image Ifm such that the difference value between the luminance value at the first flare position (xf1, yf1) and the luminance value at the second flare position (xf2, yf2) in the estimated flare image If is Nf times (Nf<1) the difference value between the luminance value at the first flare position (xf1, yf1) and the luminance value at the second flare position (xf2, yf2) in the captured image Ir, and produces the estimated flare image If. In other words, the flare model luminance adjustment unit 13 can estimate the intensity of unnecessary light without being affected by the luminance of the background, by adjusting gain of the luminance of the flare model image by using the difference between the luminance at the image position at which unnecessary light due to the light source is large and the luminance at the image position at which unnecessary light is small.

The unnecessary light subtraction unit 6 subtracts the thus produced estimated flare image If from the captured image. With this, the image processing device 2 can appropriately reduce only the luminance distribution of unnecessary light in the image in which the object having luminance in the background is captured.

Specifically, the flare image estimation unit 5 produces estimated flare image If according to the following Equation (3), Equation (4), and Equation (5). First, the flare model luminance adjustment unit 13 obtains according to Equation (3) the difference Mr between the Ir(xf1, yf1) that is the luminance at the first flare position and Ir(xf2, yf2) that is the luminance at the second flare position in the captured image Ir.

[Math 3]

$$Mr = Ir(xf1, yf1) - Ir(xf2, yf2) \quad \text{(Equation 3)}$$

Further, the flare model luminance adjustment unit 13 obtains according to Equation (4) the difference Mfm between Ifm(xf1, yf1) that is the luminance at the first flare position and the Ifm(xf2, yf2) that is the luminance at the second flare position in the flare model image Ifm produced by the flare model production unit 11.

[Math 4]

$$Mfm = Ifm(xf1, yf1) - Ifm(xf2, yf2) \quad \text{(Equation 4)}$$

The flare model luminance adjustment unit 13 obtains the estimated flare image If according to Equation (5) by using the thus obtained difference Mr in the captured image Ir and the difference Mfm in the flare model image Ifm.

[Math 5]

$$If(x, y) = Nf \cdot Ifm(x, y) \frac{Mr}{Mfm} \quad \text{(Equation 5)}$$

The unnecessary light subtraction unit 6 obtains the output image Io in which the unnecessary light has been reduced, by subtracting the thus estimated flare image If from the captured image Ir.

Figure 25A:
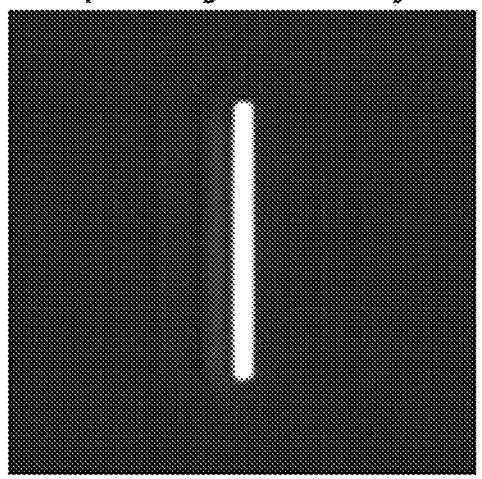
FIG. 25A is a diagram showing an output image of the first object according to Embodiment 2 of the present invention.
Figure 25B:
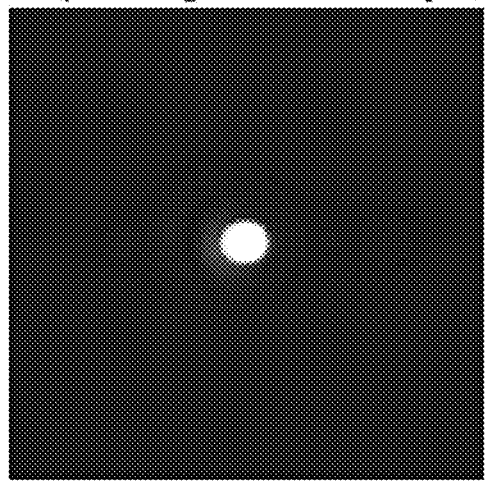
FIG. 25B is a diagram showing an output image of the second object according to Embodiment 2 of the present invention.
Figure 26A:
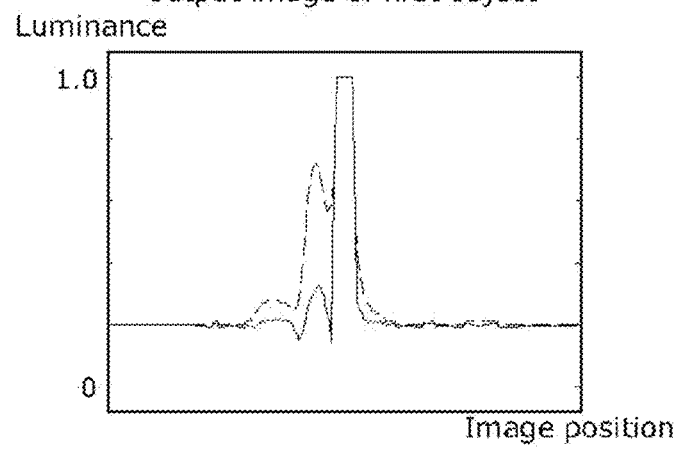
FIG. 26A is a diagram showing a luminance transition of the output image of the first object according to Embodiment 2 of the present invention.
Figure 26B:
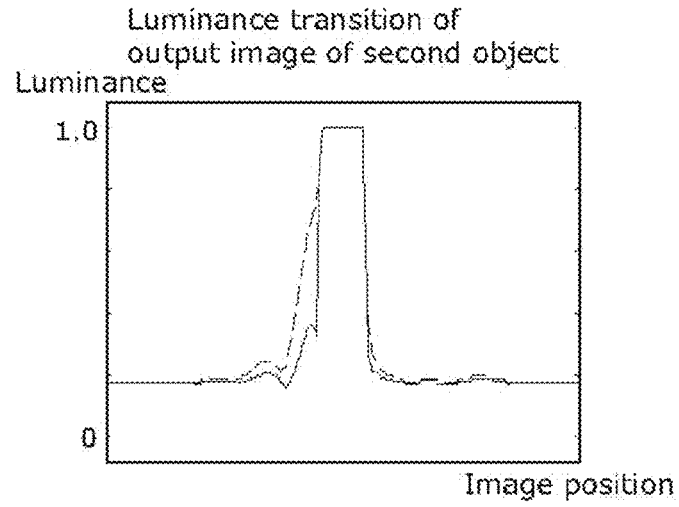
FIG. 26B is a diagram showing a luminance transition of the output image of the second object according to Embodiment 2 of the present invention.

FIG. 25A shows an output image Io of the first object. In the output image Io, unnecessary light has been reduced. FIG. 25B shows an output image Io of the second object. In the output image Io, unnecessary light has been reduced. Here, Nf is set to 0.8. FIG. 26A and FIG. 26B show luminance transition in the horizontal direction of the image near the center of the image shown in FIG. 25A and FIG. 25B, respectively. In FIG. 26A and FIG. 26B, the solid lines show the luminance transition of the output image Io and the dotted lines show the luminance transition of the captured image Ir. On any of the objects, unnecessary light is significantly reduced.

Figure 27A:
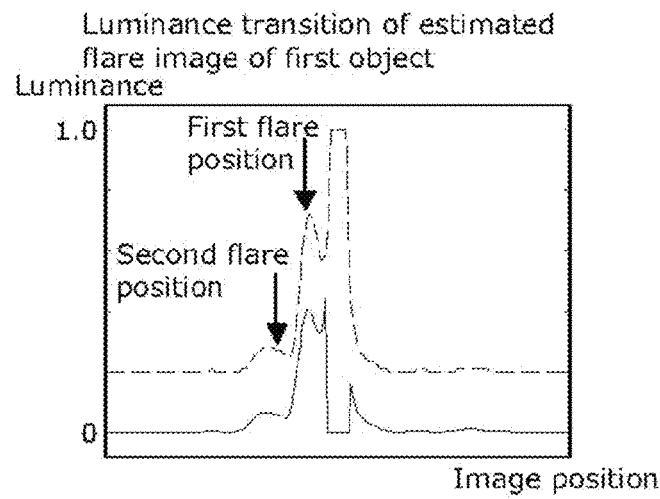
FIG. 27A is a diagram showing a luminance transition of an estimated flare image of the first object according to Embodiment 2 of the present invention.
Figure 27B:
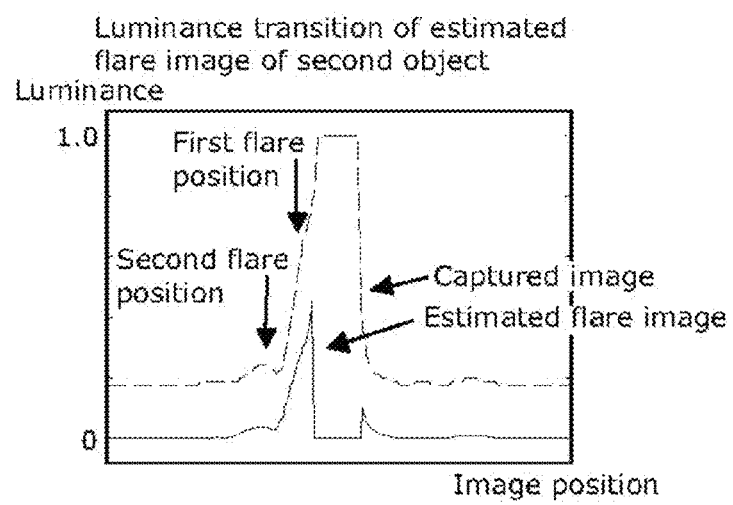
FIG. 27B is a diagram showing a luminance transition of an estimated flare image of the second object according to Embodiment 2 of the present invention.

FIG. 27A and FIG. 27B show luminance transition of the estimated flare image If of the first object and the second object, respectively. In FIG. 27A and FIG. 27B, the solid lines show the luminance transition of the estimated flare image If and the dotted lines show the luminance transition of the captured image Ir. Here, since Nf is set to 0.8, the difference between the luminance at the first flare position (xf1, yf1) and the luminance at the second flare position (xf2, yf2) in the estimated flare image If is 0.8 times the difference in the captured image Ir.

Note that the distribution of the actual unnecessary light included in the captured image Ir do not precisely match the distribution of the estimated flare image If. This is because there is a little difference between the shape of the actual light source and the shape of the luminance saturation position assumed to be the light source in this embodiment. Therefore, when Nf is set to 1.0, unnecessary light is excessively corrected in some region because of the difference between the distribution of the actual unnecessary light and the distribution of the estimated flare image. Thus, it is preferable that Nf be Nf<1.0. The degree of difference between the distribution of the actual unnecessary light and the distribution of the estimated flare image is different depending on the shooting environment where images are captured. Thus, it is preferable that the Nf be set to approximately 0.2 to 0.8 in view of the risk of excessive correction. In other words, it is preferable that the flare model luminance adjustment unit 13 adjust the gain of the luminance of the flare model image such that the difference value between the luminance values of the estimated flare image at the flare positions is 0.2 to 0.8 times the difference value between the luminance values of the captured image at the flare positions. Although the effect in reducing unnecessary light decreases with smaller Nf, unnecessary light is significantly reduced as compared to the captured image as long as the Nf is set in a range described above.

As described above, with the image processing device or the imaging device according to this embodiment, in the captured image and the flare model image, the gain of the flare model image can be adjusted by using the difference between the luminance value at the image position having large unnecessary light characteristic of the diffraction grating and the luminance value at the image position having small unnecessary light. Thus, the estimated flare image can be produced with high accuracy. The estimated flare image which is estimated as described above is subtracted from the captured image. With this, unnecessary light in the captured image obtained by one shooting can be appropriately reduced, even when the luminance of the captured image is saturated and the background has small luminance.

Note that although the unnecessary light reduction processing at an angle of view approximately 45 degrees of the captured image Ir has been described in this embodiment, when the processing is performed on the entire actual image, the image processing device 2 may, for example, divide the image into square blocks, and perform the above-described image processing for each of the blocks. When the size of the block is such that the number of pixels in the each of vertical direction and the horizontal direction is factorial of 2 such as 64 pixels to allow application of FFT calculation, fast calculation is possible. Alternatively, the flare image estimation unit 5 may obtain the estimated flare image If for each block, and the unnecessary light subtraction unit 6 may lastly perform unnecessary light subtraction processing for the entire image collectively.

At this time, the image processing device 2 may prepare and store in a memory OTF data Fo for each block assuming that the PSF does not vary significantly in each block. In this way, the calculation for image processing can be performed at high speed. Further, there is no need for reduction of unnecessary light in a block having no luminance saturation position, and thus the luminance saturation position detection unit 10 may skip unnecessary calculation for such a block. In this way, the calculation for image processing can be performed at higher speed.

Note that it is apparent that the flare distance Df, which is used to set the flare position (xf, yf), is set according to the arc-shaped flare of the PSF of each block because the PSF is different for each block. The flare distance Df may be set for each block or each image position at the time when the imaging device is shipped from the factory or may be obtained by detecting the position of the arc-shaped flare from the PSF every time when images are captured.

Note that the flowchart that shows the operations of the imaging device according to this embodiment is identical to the flowchart shown in FIG. 21 described in Embodiment 1. However, the internal processing performed in each of flare position setting Step S112 and flare model luminance adjustment Step S113 is different. In flare position setting Step S112 and flare model luminance adjustment Step S113, the processing described with reference to the flare position setting unit 12 and the flare model luminance adjustment unit 13 is performed, respectively. Note that flare position setting Step S112 may be performed before flare model production Step S111 is performed. Furthermore, the flare model production Step S111 and flare position setting Step S112 may be processed in parallel with each other.

Note that, in the output image according to this embodiment shown in FIG. 25A, as the luminance transition in FIG. 26A also shows, the unnecessary light is significantly reduced compared to the captured image shown in FIG. 22A. However, at both sides of the region, which is on the side of the optical axis (on the left in the image) and has the largest unnecessary light in FIG. 26A, the luminance of the output image is smaller than the luminance of the background due to excessive correction of unnecessary light.

This is caused by the difference between the shape of the actual light source (fluorescent lamp) and the shape of the light source estimated from the luminance saturation position. Such excessive correction of unnecessary light can occur depending on the object, which can cause unnatural luminance distribution to appear in the output image.

In this case, the luminance saturation position detection unit 10 can reduce excessive correction by shrinking the periphery of the shape of the light source estimated from the luminance saturation position so that the size of the light source image becomes smaller. In other words, the luminance saturation position detection unit 10 produces, as the light source image, the image obtained by shrinking a light source image which is formed as a set of the luminance saturation positions each of which is the luminance saturation position.

Figure 28:
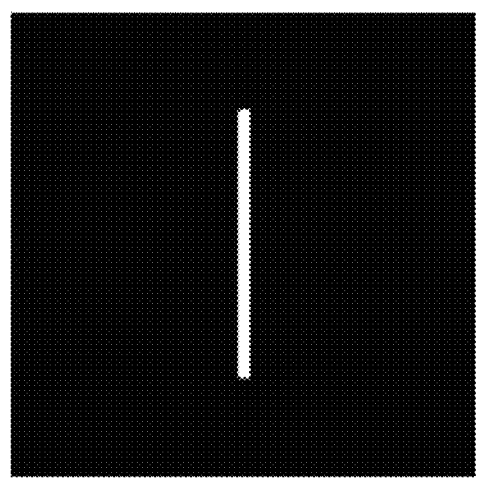
FIG. 28 is a diagram showing a light source image after a shrinking is performed according to a variation of Embodiment 2 of the present invention.
Figure 29A:
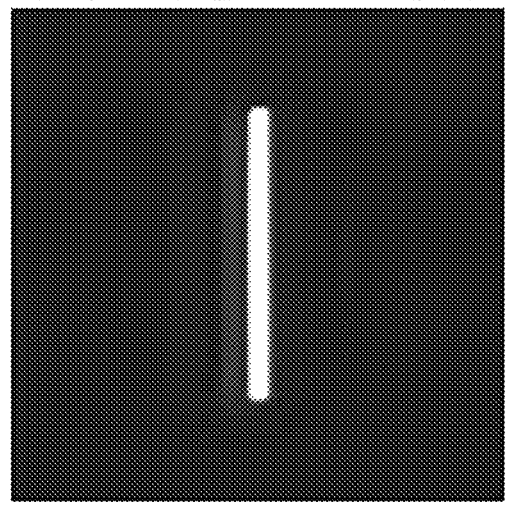
FIG. 29A is a diagram showing an output image according to the variation of Embodiment 2 of the present invention.
Figure 29B:
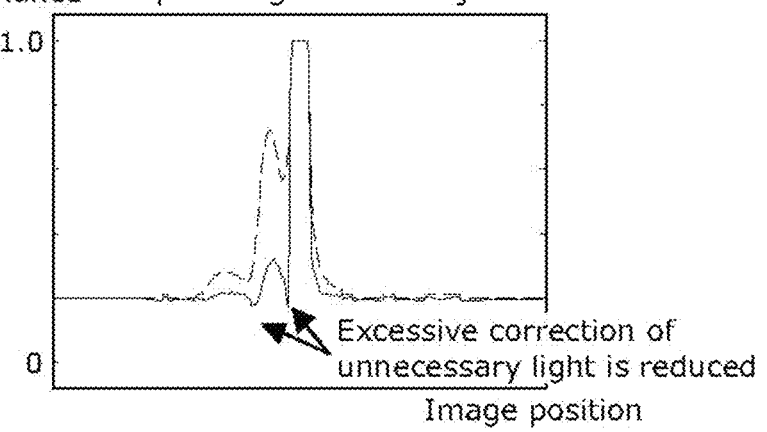
FIG. 29B is a diagram showing a luminance transition of the output image according to the variation of Embodiment 2 of the present invention.

FIG. 28 shows the light source image obtained by shrinking the light source image Is shown in FIG. 10 by one pixel on each side. In FIG. 10, the width in the horizontal direction in the light source image is nine pixels. In FIG. 28, since the outer shape of the light source image is shrunk by one pixel on each side, the width of the light source image is seven pixels. FIG. 29A and FIG. 29B show the output image Io and the luminance transition in the horizontal direction near the center of the output image Io, respectively, when the image processing is performed by newly using the light source image as the light source image Is. As FIG. 29A and FIG. 29B show, excessive correction of unnecessary light is reduced and more natural output image is obtained, by shrinking the light source image. Although the number of pixels shrunk here is one pixel, suitable value is different depending on a shooting environment. Thus, the number of pixels to be shrunk may be determined according to the assumed shooting environment.

Note that, as with Embodiment 1, the inverse Fourier transform unit 18 skips subtraction of unnecessary light from the flare model image Ifm' at the luminance saturation position, by changing the luminance at the luminance saturation position of the captured image Ir to 0. However, the inverse Fourier transform unit 18 may further skip subtraction of unnecessary light at entire periphery within a width of a few pixels from the luminance saturation position of the captured image Ir. This is because the luminance saturation position of the captured image Ir is assumed to be the light source and there can be a case in which the shape of the actual light source is smaller than the assumed shape of the light source. In such case, in the surrounding area of the luminance saturation position, the luminance of the estimated flare image If can be greater than the actual luminance and the unnecessary light can be excessively reduced. The image processing device 2 can obtain a more natural output image by avoiding excessive correction of unnecessary light, by skipping subtraction of unnecessary light in the entire periphery within a width of a few pixels (e.g., one to three pixels) from the luminance saturation position of the captured image Ir. In this embodiment, subtraction of unnecessary light is skipped in the entire periphery within a width of two pixels from the luminance saturation position.

Note that, as with Embodiment 1, although this embodiment describes the method for reducing unnecessary light in the white and black image, it is apparent that the above-described method for reducing the unnecessary light can also be applied to color images. When the captured image is a color image, the image processing device 2 may produce the estimated flare image If for one of the colors from among red (R), green (G), and blue (B) and adjust, according to a ratio of unnecessary light for each of colors of R, G, and B, the gain of the estimated flare image If for each color. For example, the flare image estimation unit 5 produces an estimated flare image If_g for G. At this time, when it is predetermined that the ratio of unnecessary light of R, G, and B is approximately 0.8:1.0:0.6, the flare image estimation unit 5 produces the estimated flare image of R and B as 0.8*If_g and 0.6*If_g respectively. Then, the unnecessary light subtraction unit 6 may subtract the estimated flare images of R, G, and B from the images for R, G, and B of the captured image Ir, respectively. Note that the flare image estimation unit 5 may separately obtain the estimated flare image for each of R, G, and B. However, in this case, a PSF needs to be prepared for each of R, G, and B, and calculation time also increases. Therefore, the flare image estimation unit 5 can suppress increase in memory capacity or calculation time, by producing, based on the estimated flare image for one of the colors of R, G, and B, the estimated flare image for other colors from among R, G, and B.

Note that, to obtain the PSFs shown in FIG. 24 and FIG. 2A, the PSF including the arc-shaped unnecessary light may be obtained by actually capturing a point light source by using the optical system of the imaging unit 1. Alternatively, the PSF including the arc-shaped unnecessary light may be obtained by simulating a structure of the optical system.

Note that although the flare position setting unit 12 sets two flare positions (the first flare position and the second flare position) in this embodiment, three or more flare positions may be set. When three or more flare positions are set, too, the flare position setting unit 12 may adjust the gain of the luminance of the flare model image by using a ratio between (i) a difference value between luminance values of the captured image at three or more flare positions and (ii) a difference value between luminance values of the flare model image at three or more flare positions. Specifically, the flare position setting unit 12 may adjust the gain of the luminance of the flare model image by using the ratio between the representative value (e.g., average value, greatest value, or the like) of difference value of luminance values among the flare positions in the captured image and the representative value of the difference value of luminance values among the flare positions in the flare model image.

Although the image processing device or the imaging device according to an aspect of the present invention has been described thus far based on the embodiments, the present invention is not limited to the above embodiments. The scope of the present invention includes various modifications to the embodiments that may be conceived by those skilled in the art or forms constructed by combining structural elements in different embodiments, which do not depart from the essence of the present invention.

For example, in the above Embodiments 1 and 2, the flare model production unit 11 includes: the Fourier transform unit 15, the OTF production unit 16, the multiplication unit 17, and the inverse Fourier transform unit 18. However, when the flare model image is produced in a spatial domain as described above, the flare model production unit 11 does not have to include such processing units.

Furthermore, a part or all of the structural elements included in the image processing device 2 according to Embodiment 1 or 2 may be provided in one system LSI (large scale integration). For example, the image processing device 2 may be made up of a system LSI including the flare image estimation unit 5 and the unnecessary light subtraction unit 6.

The system LSI is a super multifunctional LSI manufactured by integrating plural components into one chip and is specifically a computer system which includes a microprocessor, a read only memory (ROM), a random access memory (RAM) and so on. The ROM stores a computer program. The microprocessor operates according to the computer program so that the system LSI can perform its function.

The name used here is LSI, but it may also be called IC, LSI, super LSI, or ultra LSI depending on the degree of integration. Moreover, the means for circuit integration is not limited to an LSI, and implementation with a dedicated circuit or a general-purpose processor is also available. It is also acceptable to use an FPGA (Field Programmable Gate Array) that is programmable after the LSI has been manufactured or a reconfigurable processor in which connections and settings of circuit cells within the LSI are reconfigurable.

In the future, if integrated circuit technology that replaces LSI appears through progress in semiconductor technology or other derived technology, that technology can naturally be used to carry out integration of functional blocks. Application of biotechnology is one such possibility.

Furthermore, the present invention can be realized not only as the image processing device which includes the characteristic processing units, but also as the image processing method which includes, as steps, the characteristic processing units included in the image processing device. Furthermore, the present invention can also be realized as a computer program which causes a computer to execute the characteristic steps included in the image processing method. In addition, it goes without saying that such a computer program can be distributed via a non-transitory computer-readable recording medium such as a compact disk read-only memory (CD-ROM) or via a communication network such as the Internet.

INDUSTRIAL APPLICABILITY

The present invention is useful for imaging apparatuses in general that capture an object image using an optical system, such as a digital still camera, a digital video camera, a mobile telephone camera, a monitoring camera, a medical camera, a telescope, a microscope, a vehicle-installed camera, a stereo ranging camera, a multi-lens camera.

[Reference Signs List]
1 Imaging unit
2 Image processing device
5 Flare image estimation unit
6 Unnecessary light subtraction unit
10 Luminance saturation position detection unit
11 Flare model production unit
12 Flare position setting unit
13 Flare model luminance adjustment unit
15 Fourier transform unit
16 OTF production unit
17 Multiplication unit
18 Inverse Fourier transform unit
200 Optical system
201 Lens
202 Diffractive lens
203 First component
204 Second component
206 Diffraction grating
208 Imaging device
209 Imaging surface
210 Optical axis
211 Diaphragm
301 Diffraction grating
302 Diffraction ring
305 Banded flare light

The invention claimed is:

1. An image processing device which reduces an unnecessary light component in an image captured through an optical system including a diffractive optical element, said image processing device comprising:
 a flare image estimation unit configured to produce an estimated flare image that appears around a bright object in the captured image; and
 an unnecessary light subtraction unit configured to subtract the estimated flare image from the captured image,
 wherein said flare image estimation unit includes:
  a luminance saturation position detection unit configured to detect a luminance saturation position to produce a light source image, the luminance saturation position being an image position in the captured image at which a luminance value is greater than a predetermined value;

a flare model production unit configured to produce a flare model image based on the light source image and optical characteristics data of the optical system;

a flare position setting unit configured to set, as a flare position, a predetermined image position, which is an image position in the captured image and located near the luminance saturation position and on a side of an optical axis relative to the luminance saturation position; and a flare model luminance adjustment unit configured to produce the estimated flare image by adjusting a gain of a luminance of the flare model image, based on a relationship between a luminance value of the captured image at the flare position and a luminance value of the flare model image at the flare position.

2. The image processing device according to claim 1, wherein said flare position setting unit is configured to set the flare position, and said flare model luminance adjustment unit is configured to adjust the gain of the luminance of the flare model image by using a ratio between a luminance value of the captured image at the flare position and a luminance value of the flare model image at the flare position.

3. The image processing device according to claim 2, wherein said flare position setting unit is configured to set, as the flare position, an image position which is near the luminance saturation position and corresponds to a position that is predetermined as a position having strong unnecessary light in a point spread function (PSF) corresponding to the luminance saturation position.

4. The image processing device according to claim 2, wherein said flare model luminance adjustment unit is configured to adjust the gain of the luminance of the flare model image such that a luminance value of the estimated flare image at the flare position is 0.2 to 0.8 times the luminance value of the captured image at the flare position.

5. The image processing device according to claim 1, wherein said flare position setting unit is configured to set more than one flare positions each of which is the flare position, and said flare model luminance adjustment unit is configured to adjust the gain of the luminance of the flare model image by using a ratio between (i) a difference value between luminance values of the captured image at the flare positions and (ii) a difference value between luminance values of the flare model image at the flare positions.

6. The image processing device according to claim 5, wherein said flare position setting unit is configured to set, as the flare positions, at least (i) an image position which is near the luminance saturation position and corresponds to a first position, and (ii) an image position corresponding to a second position, the first position being predetermined as a position having strong unnecessary light in a PSF corresponding to the luminance saturation position, and the second position being predetermined as a position having unnecessary light weaker than the unnecessary light at the first position.

7. The image processing device according to claim 5, wherein said flare model luminance adjustment unit is configured to adjust the gain of the luminance of the flare model image such that the difference value between the luminance values of the estimated flare image at the flare positions is 0.2 to 0.8 times the difference value between the luminance values of the captured image at the flare positions.

8. The image processing device according to claim 1, wherein said unnecessary light subtraction unit is configured to skip subtracting, from the captured image, the estimated flare image at an image position adjacent to the luminance saturation position and within a width of a predetermined number of pixels from the luminance saturation position.

9. The image processing device according to claim 1, wherein said luminance saturation position detection unit is configured to produce, as the light source image, an image obtained by shrinking a light source image which is formed as a set of luminance saturation positions each of which is the luminance saturation position.

10. The image processing device according to claim 1, wherein said image processing device is implemented as an integrated circuit.

11. An imaging device comprising:

an imaging unit configured to capture an image through an optical system including a diffractive optical element; and said image processing device according to claim 1.

12. An image processing method which reduces an unnecessary light component in an image captured through an optical system including a diffractive optical element, said image processing method comprising:

producing, using a processor, an estimated flare image that appears around a bright object in the captured image; and subtracting the estimated flare image from the captured image, wherein said producing includes:

detecting a luminance saturation position to produce a light source image, the luminance saturation position being an image position in the captured image at which a luminance value is greater than a predetermined value;

producing a flare model image based on the light source image and optical characteristics data of the optical system;

setting, as a flare position, a predetermined image position, which is an image position in the captured image and located near the luminance saturation position and on a side of an optical axis relative to the luminance saturation position; and producing the estimated flare image by adjusting a gain of a luminance of the flare model image, based on a relationship between a luminance value of the captured image at the flare position and a luminance value of the flare model image at the flare position.

13. A non-transitory computer-readable recording medium, said recording medium having a computer program recorded thereon for causing a computer to execute the image processing method according to claim 12.

* * * * *